US012559597B2

(12) United States Patent
Komiya et al.

(10) Patent No.: US 12,559,597 B2
(45) Date of Patent: Feb. 24, 2026

(54) POLYAMIDE FINE PARTICLES AND METHOD OF PRODUCING THE SAME

(71) Applicant: Toray Industries, Inc., Tokyo (JP)

(72) Inventors: Ken Komiya, Aichi (JP); Akiyoshi Tamai, Aichi (JP); Kenichi Utazaki, Aichi (JP)

(73) Assignee: Toray Industries, Inc., Tokyo (JP)

( * ) Notice: Subject to any disclaimer, the term of this patent is extended or adjusted under 35 U.S.C. 154(b) by 287 days.

(21) Appl. No.: 18/038,689

(22) PCT Filed: Nov. 24, 2021

(86) PCT No.: PCT/JP2021/042959
§ 371 (c)(1),
(2) Date: May 24, 2023

(87) PCT Pub. No.: WO2022/113993
PCT Pub. Date: Jun. 2, 2022

(65) Prior Publication Data

US 2024/0026090 A1 Jan. 25, 2024

(30) Foreign Application Priority Data

Nov. 30, 2020 (JP) ................................ 2020-198043

(51) Int. Cl.
*C08J 3/12* (2006.01)
*C08G 69/16* (2006.01)
(Continued)

(52) U.S. Cl.
CPC ................ *C08J 3/12* (2013.01); *C08G 69/16* (2013.01); *C08G 69/24* (2013.01); *C08L 71/02* (2013.01); *C08L 2205/22* (2013.01)

(58) Field of Classification Search
CPC ... C08J 3/12-16; C08J 2377/02; C08G 69/24; C08L 71/02
See application file for complete search history.

(56) References Cited

U.S. PATENT DOCUMENTS

| | | | |
|---|---|---|---|
| 2009/0263434 | A1 | 10/2009 | Shoji et al. |
| 2013/0183528 | A1 | 7/2013 | Echigo et al. |

(Continued)

FOREIGN PATENT DOCUMENTS

| | | |
|---|---|---|
| CN | 103748143 A | 4/2014 |
| CN | 104059236 A | 9/2014 |

(Continued)

OTHER PUBLICATIONS

Machine translation JP2004035678A (Year: 2004).*

(Continued)

*Primary Examiner* — Alexandre F Ferre
(74) *Attorney, Agent, or Firm* — DLA Piper LLP (US)

(57) ABSTRACT

Polyamide fine particles include a polymer or a copolymer including a repeating structure unit represented by Formula (1) as a main component, wherein a ratio ($r/A_{BET}$) of a porosity r occupying a particle surface and a BET specific surface area $A_{BET}$ that is a specific surface area of the particle surface measured by a BET method is 6.0 or more and 100.0 or less:

Formula (1)

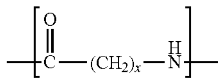

wherein x is an integer of 2 or more and 3 or less.

18 Claims, 2 Drawing Sheets

(51) Int. Cl.
*C08G 69/24* (2006.01)
*C08L 71/02* (2006.01)

(56) References Cited

U.S. PATENT DOCUMENTS

| | | | |
|---|---|---|---|
| 2014/0275439 A1 | 9/2014 | Yamano et al. | |
| 2014/0349113 A1 | 11/2014 | Saito et al. | |
| 2015/0031834 A1 | 1/2015 | Kobayashi et al. | |
| 2016/0272776 A1 | 9/2016 | Arai et al. | |
| 2018/0105669 A1 | 4/2018 | Mutsuda et al. | |
| 2020/0048413 A1 | 2/2020 | Asano | |
| 2020/0079916 A1 | 3/2020 | Kobayashi et al. | |
| 2020/0179261 A1 | 6/2020 | Yamane et al. | |
| 2020/0207931 A1 | 7/2020 | Mitsuteru et al. | |
| 2020/0231751 A1* | 7/2020 | Yamane | C08G 69/18 |
| 2020/0262976 A1 | 8/2020 | Fukawa et al. | |
| 2020/0377655 A1 | 12/2020 | Xiao et al. | |
| 2021/0403651 A1 | 12/2021 | Asano et al. | |

FOREIGN PATENT DOCUMENTS

| | | | |
|---|---|---|---|
| CN | 104105740 A | | 10/2014 |
| CN | 110402266 A | | 11/2019 |
| CN | 111094402 A | | 5/2020 |
| JP | H8-12765 A | | 1/1996 |
| JP | 2004-002731 A | | 1/2004 |
| JP | 2004035678 A | * | 2/2004 |
| JP | 2006-249272 A | | 9/2006 |
| JP | 2010-132768 A | | 6/2010 |
| JP | 2011-094128 A | | 5/2011 |
| JP | 5446172 B2 | | 3/2014 |
| JP | 2014-105259 A | | 6/2014 |
| JP | 2015-131968 A | | 7/2015 |
| JP | 2015-182979 A | | 10/2015 |
| JP | 2016-186068 A | | 10/2016 |
| JP | 2018-193500 A | | 12/2018 |
| JP | 2020-100846 A | | 7/2020 |
| WO | 2013/058019 A1 | | 4/2013 |
| WO | 2016/104140 A1 | | 6/2016 |
| WO | 2017/195705 A1 | | 11/2017 |
| WO | 2018/230405 A1 | | 12/2018 |
| WO | 2019/069799 A1 | | 4/2019 |
| WO | 2019/156116 A1 | | 8/2019 |
| WO | 2020/095702 A1 | | 5/2020 |

OTHER PUBLICATIONS

International Search Report dated Feb. 8, 2022 in counterpart International Application No. PCT/JP2021/042959 w/English translation.

Written Opinion dated Feb. 8, 2022 in counterpart International Application No. PCT/JP2021/042959.

Extended European Search Report dated Sep. 25, 2024, from counterpart European Application No. 21 89 7965.6.

Office Action dated Feb. 13, 2025, from counterpart Chinese Patent Application No. 202180078890.6.

Xiangzeng, M et al., "Manufacture and Application of Polyamide Particles," Dept. of Fine Chemicals, School of Chemical Engineering, Dalian University of Technology, Dalian, 116012, May 17, 1992.

First Office Action dated Apr. 10, 2024, of counterpart Chinese Patent Application No. 202180078890.6, along with an English machine translation.

N.V. Dencheva et al., "Bovine Serum Albumin-imprinted Magnetic Poly(2-pyrrolidone) Microparticles for Protein Recognition," European Polymer Journal, 122, pp. 1-14, 2020.

* cited by examiner

POLYAMIDE FINE PARTICLES AND METHOD OF PRODUCING THE SAME

TECHNICAL FIELD

This disclosure relates to polyamide fine particles and a method of producing the same.

BACKGROUND

Polyamide fine particles have excellent toughness and heat stability and thus have been suitably used for applications of aircrafts, automobiles, and cosmetics. Of those applications, in the cosmetic applications, the polyamide fine particles are used for powder foundations and the like due to their excellent slipperiness.

In recent years, however, influences of microplastics in the sea on the ecosystems have been concerned and thus regulations restricting the use of the microplastics have been enhanced. Under such circumstances, marine biodegradable plastics, which are degraded into substances existing in nature by the action of microorganisms, have attracted attention. The polyamide fine particles have also required to have the marine biodegradability. To obtain such polyamide fine particles, development has been rapidly progressed.

For example, Japanese Patent Application Laid-open No. 2020-100846 discloses polyamide 4 fine particles having the marine biodegradability, surface smoothness, and a sphericity of 95.

Japanese Patent Application Laid-open No. 2016-186068 discloses polyamide 4 fine particles having the marine biodegradability, moderate sphericity, and a porous shape.

WO 2017/195705 discloses polyamide 4 fine particles having the marine biodegradability, the moderate sphericity, and low surface smoothness.

WO 2019/069799 discloses polyamide 4 fine particles having the marine biodegradability, moderate sphericity, and large variety of sphericity.

However, in JP '846, specific examples of the polyamide 4 fine particles having a smooth surface and a sphericity of 96 or more are not described and thus none of the average deviation of the coefficient of dynamical friction at the time of rubbing the particles together and the average deviation of the coefficient of dynamical friction after rubbing together over time (hereinafter, abbreviated as a coefficient of dynamical friction after time elapsed) due to the smooth surface and this sphericity have been described.

In JP '068, the polyamide 4 fine particles are produced by bringing 2-pyrrolidone, which is the monomer of polyamide 4, into contact with a compressible fluid to form fine particles. The obtained polyamide 4 fine particles, however, had moderate sphericity, hollowness, and a porous shape. As a result, the average deviation of the coefficient of dynamical friction at the time of rubbing the fine particles together and the average deviation of the coefficient of dynamical friction after time elapsed became large and thus the respective average deviations of the coefficients of dynamical friction were insufficient from the viewpoint of the slipperiness of the polyamide 4 fine particles.

In WO '705, the polyamide 4 fine particles were produced by dissolving polyamide 4 in hot water followed by reprecipitation. The obtained polyamide 4 fine particles, however, had low and highly varied sphericity and low surface smoothness. As a result, the average deviation of the coefficient of dynamical friction at the time of rubbing the fine particles together and the average deviation of the coefficient of dynamical friction after time elapsed became large and thus the respective average deviations of the coefficients of dynamical friction were insufficient from the viewpoint of the slipperiness of the polyamide 4 fine particles.

In WO '799, the polyamide 4 fine particles were produced by suspension polymerization of 2-pyrrolidone using a lithium salt in an aprotic solvent. The obtained polyamide 4 fine particles, however, had moderate and highly varied sphericity and rough surface. As a result, both of the average deviation of the coefficient of dynamical friction at the time of rubbing the fine particles together and the average deviation of the coefficient of dynamical friction after time elapsed were insufficient from the viewpoint of the slipperiness of the polyamide 4 fine particles.

It could therefore be helpful to provide polyamide fine particles having a small average deviation of the coefficient of dynamical friction at the time of rubbing the fine particles together, a small average deviation of the coefficient of dynamical friction after time, and the marine biodegradability.

SUMMARY

We found that either fine particles having a specific poriamide structure in which a ratio of a porosity occupying a particle surface and a specific surface area of the particle surface is within a predetermined range or fine particles having a specific poriamide structure in which a sphericity is 90 or more have excellent average deviation of the coefficient of dynamical friction at the time of rubbing the particles together, excellent average deviation of the coefficient of dynamical friction after time elapsed, and the marine biodegradability and completed this disclosure.

We thus provide polyamide fine particles that include a polymer or a copolymer including a repeating structure unit represented by Formula (1) as a main component. A ratio ($r/A_{BET}$) of a porosity r occupying a particle surface and a BET specific surface area $A_{BET}$ that is a specific surface area of the particle surface measured by a BET method is 6.0 or more and 100.0 or less:

Formula (1)

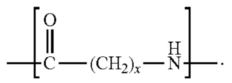

In Formula (1), x is an integer of 2 or more and 3 or less.

In the polyamide fine particles, the BET specific surface area $A_{BET}$ is 0.8 $m^2/g$ or more and 5.0 $m^2/g$ or less.

In the polyamide fine particles, sphericity is 90 or more.

In the polyamide fine particles, an amount of impurities contained is 0.50% by weight or less.

In the polyamide fine particles, volume average particle diameter is 0.1 μm or more and 100 μm or less.

The standard deviation of sphericity is 2.00 or less.

In the polyamide fine particles, x in Formula (1) is 3.

A stability index over time that is an index representing stability toward deterioration in feel to the polyamide fine particles that are continuously rubbed is calculated in accordance with the following formula and is 0.60 or more:

$$\text{Temporal stability index}=1/(\text{Standard deviation of sphericity}\times(1+\text{Amount of impurities contained})).$$

In the above formula, the standard deviation of sphericity is a standard deviation of sphericity of the polyamide fine particles, and the amount of impurities contained is an amount of impurities contained in the polyamide fine particles.

A method of producing polyamide fine particles produces polyamide fine particles using a resin (A) and a resin (B) as raw materials, the resin (A) being a polymer or a copolymer including a repeating structure unit represented by Formula (1) as a main component, the resin (B) being an emulsion formation resin capable of forming an emulsion with the resin (A) in a molten state. The method includes: an emulsion formation step of melt mixing the resin (A) and the resin (B) at a melting temperature equal to or higher than respective melting points to form an emulsion in which the resin (A) in a particulate form is dispersed in the resin (B); an immobilization step of cooling a molten mixture in which the emulsion of the resin (A) and the resin (B) is formed to a temperature equal to or lower than a crystallization temperature of the resin (A) to immobilize the emulsion; and a collecting step of removing the resin (B) by washing with a washing solution that is a non-solvent of the resin (A) to collect polyamide fine particles formed of the resin (A). The melt viscosity ratio of the resin (A) and the resin (B) at 270° C. is 4.3 or more and 125.0 or less:

Formula (1)

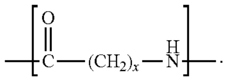

In Formula (1), x is an integer of 2 or more and 3 or less.

In the method of producing polyamide fine particles, the immobilization step includes: a retention step of retaining a temperature of the molten mixture in a temperature range of more than a crystallization temperature of the resin (A) and less than the melting point of the resin (A); and a cooling step of cooling the temperature of the molten mixture that has been retained in the temperature range, to the crystallization temperature of the resin (A) or lower.

In the method, at the retention step, the temperature of the molten mixture is retained in the temperature range for 30 minutes or more and 10 hours or less.

In the method, the immobilization step includes: a retention step of retaining a temperature of the molten mixture in a temperature range of higher than a crystallization temperature of the resin (A) and lower than a melting point of the resin (A) for 1 second or more and 10 minutes or less; and a cooling step of cooling the temperature of the molten mixture that has been retained in the temperature range, to the crystallization temperature of the resin (A) or lower.

The emulsion formation step includes a temperature rising step of raising a temperature of the resin (A) and the resin (B) from room temperature to the melting temperature.

The melt viscosity of the resin (B) at 270° C. is 0.40 Pa·s or more and 5.00 Pa·s or less.

In the method, the resin (B) is polyethylene glycol.

At the emulsion formation step, the resin (A) and the resin (B) are melt-mixed at the melting temperature equal to or more than a melting point of the resin (A)+5° C. and equal to or less than 280° C.

The polyamide fine particles have a sphericity of 96 or more and include a polymer or a copolymer including a repeating structure unit represented by Formula (1) as a main component:

Formula (1)

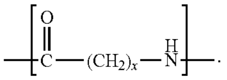

In Formula (1), x is an integer of 2 or more and 3 or less.

In the polyamide fine particles, the amount of impurities contained is 0.50% by weight or less.

The polyamide fine particles have a BET specific surface area $A_{BET}$ that is a specific surface area of a particle surface measured by a BET method is 5.0 $m^2/g$ or less.

The volume average particle diameter is 0.1 μm or more and 100.0 μm or less.

The standard deviation of sphericity is 2.00 or less.

In the polyamide fine particles, x in Formula (1) is 3.

The stability index over time that is an index representing stability toward deterioration in feel to the polyamide fine particles that are continuously rubbed is calculated in accordance with the following formula and is 0.60 or more:

Temporal stability index=1/(Standard deviation of sphericity×(1+Amount of impurities contained)).

In the above formula, the standard deviation of sphericity is a standard deviation of sphericity of the polyamide fine particles, and the amount of impurities contained is an amount of impurities contained in the polyamide fine particles.

Accordingly, the effects of providing the polyamide fine particles having the small average deviation of the coefficient of dynamical friction at the time of rubbing the particles together, the small average deviation of the coefficient of dynamical friction after time elapsed, and the marine biodegradability can be exhibited.

DETAILED DESCRIPTION

Figure 1:
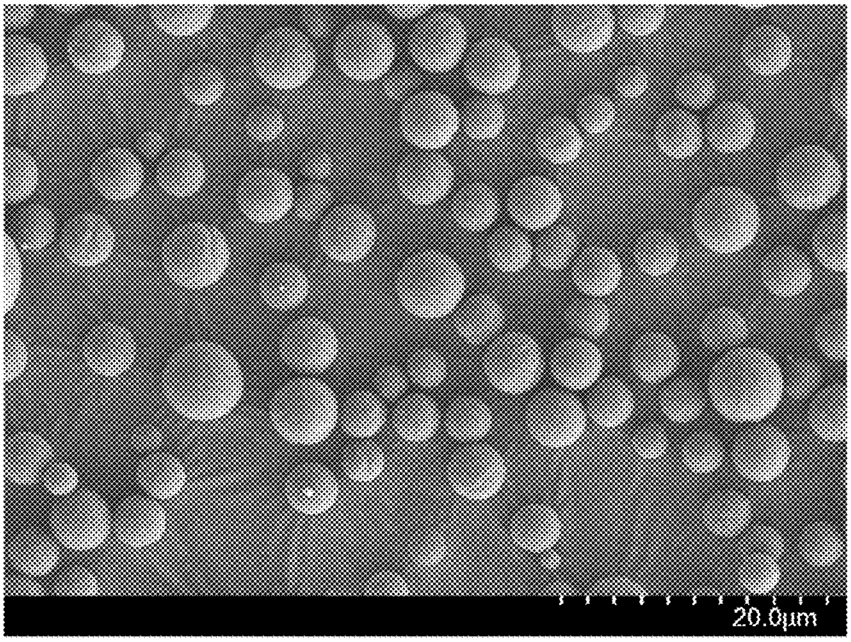
FIG. 1 is a photograph of polyamide fine particles in Example 1 observed using a scanning electron microscope at a magnification of 2,000 times.

Hereinafter, suitable examples of our polyamide fine particles and the methods of producing the same will be described in detail. Our fine particles and methods, however, are not limited to the first and the second examples and can be implemented by variously modifying depending on the targets and the applications.

First Example

Polyamide Fine Particles

The polyamide fine particles according to the first example have surface smoothness and high true spherical shape comprising a polymer or a copolymer including a repeating structure unit represented by Formula (1) as a main component, in which sphericity is 96 or more:

Formula (1)

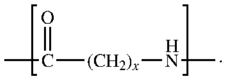

In Formula (1), x is an integer of 2 or more and 3 or less.

First, the structure and the form constituting the polyamide fine particles according to the first example (may be referred to as polyamide fine particles (P1)) will be described. The polyamide fine particles (P1) are fine particles including a polymer or a copolymer including a structure unit represented by Formula (1) as a main repeating structure unit. x in Formula (1) is 2 or 3. When this x is neither 2 nor 3, the polyamide fine particles (P1) do not have sufficient marine biodegradability. From the viewpoint of excellent handling properties of the polyamide fine particles (P1), this x is preferably 3. The polyamide fine particles (P1) may include a cross-linked structure or a branched structure as long as the desired effects according to this first example are not impaired.

The sphericity of polyamide fine particles (P1) is 96 or more. Polyamide fine particles having a sphericity of less than 96 result in large average deviation of the coefficient of dynamical friction. As a result, touching feeling is not excellent when the polyamide fine particles are touched. Continuously rubbing these polyamide fine particles having a sphericity of less than 96 causes the average deviation of the coefficient of dynamical friction after time elapsed to become large due to coagulation or twisting of these polyamide fine particles with each other. As a result, the touching feeling after continuously using these polyamide fine particles deteriorates. Therefore, when these polyamide fine particles are used for applications for cosmetics and paints, smooth feel cannot be obtained. From these viewpoints, the sphericity of the polyamide fine particles (P1) is 96 or more as described above. The sphericity is preferably 97 or more, more preferably 98 or more, and further preferably 100. The upper limit value of the sphericity of the polyamide fine particles (P1) is 100.

The standard deviation of sphericity of the polyamide fine particles (P1) is preferably 2.00 or less. The polyamide fine particles having a standard deviation of sphericity of 2.00 or less allow the deterioration in the touching feeling due to coagulation or twisting to be less likely to occur when the polyamide fine particles (P1) are continuously rubbed and thus the average deviation of the coefficient of dynamical friction after time elapsed to be small. This provides smooth feel when the polyamide fine particles (P1) are used for the applications for cosmetics and paints, which is preferable. The standard deviation of sphericity of the polyamide fine particles (P1) is more preferably 1.75 or less, further preferably 1.50 or less, further more preferably 1.30 or less, and particularly preferably 1.10 or less. With respect to the polyamide fine particles (P1), theoretically, the lower limit value of the standard deviation of sphericity is 0.

The sphericity and the standard deviation of sphericity of the polyamide fine particles (P1) each are determined by, for example, observing randomly selected 50 polyamide fine particles (P1) from the photograph of the polyamide fine particles (P1) taken by a scanning electron microscope at a magnification of 2,000 times or more and 5,000 times or less and calculating from the minor axis and a major axis of the observed polyamide fine particles (P1) in accordance with Mathematical Formulae (1) and (2). The value of the sphericity is represented as an integer obtained by rounding off. For example, when the calculated value of the sphericity is 99.5 or more, the value of the sphericity of the polyamide fine particles (P1) is represented as 100.

Mathematical Formula (1)

$$T = \left(\frac{1}{n}\sum_{i=1}^{n}\frac{b_i}{a_i}\right) \times 100$$

T: (Average value of) sphericity, $a_i$: Major axis of each fine particle, $b_i$: Minor axis of each fine particle, and n: Number of measurements.

Mathematical Formula (2)

$$s = \sqrt{\frac{1}{n}\sum_{i=1}^{n}(T_i - T)^2}$$

s: Standard deviation of sphericity, $T_i$: Sphericity of each fine particle, T: (Average value of) sphericity, and n: Number of measurements.

In Mathematical Formulae 1 and 2, the number of measurements n is each number of measurements of the sphericity, the minor axis, and major axis of the target fine particles. For example, in the first example, the number of measurements n of the polyamide fine particles (P1) is n=50.

The volume average particle diameter of the polyamide fine particles (P1) is preferably 0.1 μm or more and 100.0 μm or less. The polyamide fine particles (P1) having a volume average particle diameter of 100.0 μm or less allow the feel when the polyamide fine particles (P1) are touched to be excellent and the standard deviation of the coefficient of dynamical friction immediately after the start of measurement to be small, which is preferable. The coefficient of dynamical friction immediately after the start of measurement refers to a coefficient of dynamical friction immediately after the measurement of the target fine particles (in the first example, the polyamide fine particles (P1)) is started, that is, a coefficient of dynamical friction in the stage where the fine particles are started to be rubbed together. The upper limit value of the volume average particle diameter of the polyamide fine particles (P1) is more preferably 50.0 μm or less, further preferably 30.0 μm or less, further more preferably 15.0 μm or less, especially preferably 13.0 μm or less, and particularly preferably 10.0 μm or less. The polyamide fine particles (P1) having a volume average particle diameter of 0.1 μm or more allow the coagulation of the polyamide fine particles (P1) with each other to be less likely to occur, deterioration in the feel caused by the coagulation to be reduced, and the average deviations of the coefficients of dynamical friction immediately after the start of measurement and after time elapsed to be small, which is preferable. The lower limit value of the volume average particle diameter of the polyamide fine particles (P1) is more preferably 0.3 μm or more, further preferably 0.5 μm or more, and particularly preferably 1.0 μm or more.

A particle size distribution index representing the particle size distribution of the polyamide fine particles (P1) is preferably 3.0 or less. The polyamide fine particles (P1) having a particle size distribution index of 3.0 or less allow flowability to be excellent and slipperiness to be better in the applications using the polyamide fine particles (P1) such as paints and cosmetics. The particle size distribution index of the polyamide fine particles (P1) is more preferably 2.0 or less, further preferably 1.5 or less, further more preferably 1.3 or less, and particularly preferably 1.2 or less. Theoretically, the lower limit value of the particle size distribution index of the polyamide fine particles (P1) is 1.0.

The volume average particle diameter and the number average particle diameter of the polyamide fine particles (P1) refer to a volume average particle diameter and a number average particle diameter measured by a laser scattering particle size distribution analyzer, respectively. The particle size distribution index of the polyamide fine particles (P1) is calculated in accordance with Mathematical Formula (3) using each of the values of the volume average particle diameter and the number average particle diameter determined as described above:

Particle size distribution index=Volume average particle diameter/Number average particle diameter. Mathematical Formula (3)

The BET specific surface area $A_{BET}$ of the polyamide fine particles (P1) is preferably 5.0 $m^2/g$ or less. The surface smoothness of the polyamide fine particles (P1) can be represented by the BET specific surface area $A_{BET}$ by gas adsorption. As the polyamide fine particles (P1) do not have a hollow structure and the surface of the polyamide fine particles (P1) becomes smoother, the value of the BET specific surface area $A_{BET}$ becomes smaller. As the value of the BET specific surface area $A_{BET}$ becomes smaller, the deterioration in the touching feeling due to coagulation or twisting of the polyamide fine particles (P1) does not occur when the polyamide fine particles (P1) are continuously rubbed and the average deviation of the coefficient of dynamical friction after time elapsed becomes smaller. Therefore, as the BET specific surface area $A_{BET}$ becomes smaller, the polyamide fine particles (P1) become more preferable. From the viewpoint of the touching feeling when the polyamide fine particles (P1) are continuously rubbed, the upper limit value of the BET specific surface area $A_{BET}$ of the polyamide fine particles (P1) is preferably 5.0 $m^2/g$ or less, more preferably 4.0 $m^2/g$ or less, further preferably 3.0 $m^2/g$ or less, further more preferably 2.0 $m^2/g$ or less, and particularly preferably 1.0 $m^2/g$ or less.

The BET specific surface area $A_{BET}$ refers to a specific surface area of a particle surface measured by the BET method and, for example, can be measured in accordance with JIS R1626 (1996) "Measuring methods for the specific surface area by gas adsorption using the BET method" in Japanese Industrial Standards (JIS Standers).

The weight average molecular weight of the polyamide fine particles (P1) is preferably 2,000 or more and 2,000,000 or less. The polyamide fine particles (P1) having a weight average molecular weight of 2,000 or more allow the deterioration in the touching feeling due to coagulation or twisting of the polyamide fine particles (P1) to be less likely to occur when the polyamide fine particles (P1) are continuously rubbed and thus the average deviation of the coefficient of dynamical friction after time elapsed to be small, which is preferable. The lower limit value of the weight average molecular weight of the polyamide fine particles (P1) is more preferably 3,000 or more, further preferably 4,000 or more, and further more preferably 5,000 or more. The polyamide fine particles (P1) having a weight average molecular weight of 2,000,000 or less allow the standard deviation of the coefficient of dynamical friction immediately after the start of measurement to be small and the touching feeling at the time of rubbing the polyamide fine particles (P1) together to be excellent, which is preferable. The upper limit value of the weight average molecular weight of the polyamide fine particles (P1) is more preferably 1,000,000 or less, further preferably 500,000 or less, further more preferably 100,000 or less, especially preferably 50,000 or less, and particularly preferably less than 30,000.

The weight average molecular weight can be calculated using, for example, gel permeation chromatography (GPC). Specifically, the weight average molecular weight can be measured by using a solvent in which the compound is dissolved, for example, 1,1,1,3,3,3-hexafluoro-2-propanol, as a mobile phase and polymethyl methacrylate (PMMA) as a standard substance, selecting a column that matches the solvent, for example, using at least one of "Shodex GPC HFIP-806M" and "Shodex GPC HFIP-LG" manufactured by SHIMADZU GLC Ltd. when 1,1,1,3,3,3-hexafluoro-2-propanol is used, and using a refractive index detector is used as a detector.

The amount of impurities contained in the polyamide fine particles (P1) is preferably 0.50% by weight or less when the total weight of the polyamide fine particles (P1) is determined to be 100.00% by weight. The amount of impurities contained means components other than the resin (A) described below included in the polyamide fine particles (P1) such as the resin (B) described below, and catalysts and initiators used at the time of producing the resin (A) described below. The polyamide fine particles (P1) having an amount of impurities contained of 0.50% by weight or less allow the deterioration in the touching feeling due to coagulation or twisting of the polyamide fine particles (P1) to be less likely to occur and the average deviation of the coefficient of dynamical friction after time elapsed to be small. Therefore, when the polyamide fine particles (P1) are used for the applications of cosmetics and paints, smooth feel can be provided, which is preferable. The amount of impurities contained is more preferably 0.30% by weight or less and further preferably 0.10% by weight or less. Theoretically, the lower limit value of the amount of impurities contained is 0.00% by weight.

With respect to the amount of impurities contained, each content of organic substances other than the resin (A) described below included in the polyamide fine particles (P1) and inorganic substances is measured and the total amount of the contents can be determined as the amount of impurities contained. The contents of the organic substances can be determined by analyzing using, for example, methods of NMR, FT-IR, GC-MS, and liquid chromatography singly or in combination. The content of the inorganic substances can be measured by, for example, an ash content when the polyamide fine particles are incinerated at 550° C.

The polyamide fine particles (P1) preferably have a stability index over time calculated in accordance with Mathematical Formula (4) of 0.60 or more. The stability index over time refers to an index that represent stability against the deterioration in touching feeling due to coagulation and twisting of the fine particles (in the first example, the polyamide fine particles (P1)) continuously rubbed together over time. The stability index over time means that as the value of the stability index over time becomes larger, the excellent touching feeling of the fine particles can be maintained longer even when the target fine particles are continuously rubbed for a long period of time. For example, when the polyamide fine particles (P1) are used for the cosmetic application, the excellent touching feeling of the polyamide fine particles (P1) can be maintained for a long period of time. In particular, when the stability index over time is 0.60 or more, the deterioration in the touching feeling due to coagulation or twisting of the polyamide fine particles (P1) is less likely to occur when the polyamide fine particles (P1) are continuously rubbed and the average deviation of the coefficient of dynamical friction after time elapsed is small, which is preferable. The lower limit value of the stability index over time of the polyamide fine particles (P1) is more preferably 0.70 or more and further preferably 0.80 or more.

Stability index over time=1/(s×(Amount of impurities contained+1)) Mathematical Formula (4)

In Mathematical Formula (4), s is the standard deviation of sphericity of the polyamide fine particles (P1). The standard deviation of sphericity can be calculated in accordance with Mathematical Formula (2) described above. The amount of impurities contained is the amount of impurities contained in the polyamide fine particles (P1).

The polyamide fine particles (P1) also have the marine biodegradability. The marine biodegradability refers to the properties of degrading by microorganisms in the sea. As an index indicating the marine biodegradability, 10% or more of degradation after 2 months from the test in accordance with JIS K6955 (2006) is defined to have the marine biodegradability. From the viewpoint of exhibiting the excellent marine biodegradability of the polyamide fine particles (P1), the lower limit of the marine biodegradability of the polyamide fine particles (P1) is preferably 15% or more, more preferably 20% or more, and further preferably 30% or more. Excessively high marine biodegradability causes a period when the polyamide fine particles (P1) can be used as products (product lifetime of the polyamide fine particles (P1)) to be shortened. Therefore, the upper limit of the marine biodegradability of the polyamide fine particles (P1) is preferably 90% or less, more preferably 80% or less, and further preferably 70% or less.

Method of Producing Polyamide Fine Particles

Subsequently, the method of producing the polyamide fine particles according to the first example will be described in detail. The polyamide fine particles (P1) described above can be produced by the method of producing of the first example.

In detail, the method of producing the polyamide fine particles according to the first example (production method of the first example) refers to a method of producing the polyamide fine particles (P1) using a resin (A) that is a polymer or a copolymer including the repeating structure unit represented by Formula (1) described above as the main component and a resin (B) that is an emulsion formation resin capable of forming an emulsion with the resin (A) in a molten state. The production method of the first example includes an emulsion formation step, an immobilization step, and a collecting step. The emulsion formation step refers to a step of melt mixing the resin (A) and the resin (B) at a melting temperature equal to or higher than respective milting points and forming an emulsion in which the resin (A) in a particulate form is dispersed in the resin (B). The immobilization step refers to a step of cooling a molten mixture in which the emulsion is formed of the resin (A) and the resin (B) to a temperature equal to or lower than a crystallization temperature of the resin (A) to immobilize the emulsion. The collecting step refers to a step of removing the resin (B) by washing the molten mixture with a washing solution that is a non-solvent of the resin (A) to collect the polyamide fine particles formed of the resin (A). In the production method of the first example, a melt viscosity ratio of the resin (A) and the resin (B) at 270° C. is 4.3 or more and 125.0 or less.

Resin (A)

The resin (A) refers to a polymer resin used in the production method of the first example serving as a raw material of the polyamide fine particles (P1). More specifically, the resin (A) refers to a polymer or a copolymer including the structure unit represented by Formula (1) used as the main repeating structure unit:

Formula (1)

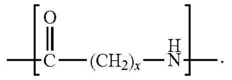

In Formula (1), x is an integer of 2 or more and 3 or less.

In the structure unit of the resin (A), x is 2 or 3. When x is neither 2 nor 3, the polyamide fine particles (P1) formed of the resin (A) do not have sufficient marine biodegradability. From the viewpoint of excellent handling properties of the polyamide fine particles (P1), x is preferably 3. The resin (A) may contain a cross-linked structure or branched structure as long as the desired effects according to the first example are not impaired.

In the first example, the melt viscosity of the resin (A) at 270° C. is not particularly limited and is preferably 0.02 Pa·s or more and 1.00 Pa·s or less. The resin (A) forms the emulsion with the resin (B) by dispersing the resin (A) into particles in the resin (B) described below and thus preferably has a certain degree of a viscosity. The lower limit value of such a melt viscosity of the resin (A) at 270° C. is preferably 0.02 Pa·s or more, more preferably 0.03 Pa·s or more, and further preferably 0.04 Pa·s or more. From the viewpoint that an emulsion diameter does not become excessively large and the true spherical shape can be maintained at the time of the emulsion formation of the resin (A) with the resin (B), the upper limit value of the melt viscosity of the resin (A) at 270° C. is preferably 1.00 Pa·s or less, more preferably 0.80 Pa·s or less, further preferably 0.50 Pa·s or less, and further more preferably 0.30 Pa·s or less.

The melt viscosity of the resin (A) described above can be measured using a rheometer. Specifically, the value of the complex viscosity of the resin (A) after 5 minutes from the start of measurement measured under conditions of a temperature of 270° C. and a frequency of 1 Hz can be determined as the melt viscosity of the resin (A).

The resin (A) used in the production method of the first example can be produced using known polymerization methods. Namely, in the production of the resin (A), for example, the polycondensation of amino acids such as 4-aminobutyric acid and 3-amino propionic acid and the ring-opening polymerization of lactams such as 2-pyrrolidone and 2-azetidinone are employed. Examples of this ring-opening polymerization include ring-opening polymerization by hydrolysis using water and anionic ring-opening polymerization. Examples of this anionic ring-opening polymerization include anionic ring-opening polymerization caused by initiators including alkali metals such as sodium and potassium, hydroxides, hydrides, and salts of alkali metals such as sodium hydroxide, potassium hydroxide, sodium hydride, potassium hydride, sodium methoxide, potassium methoxide, sodium ethoxide, potassium ethoxide, sodium t-butoxide, potassium t-butoxide, sodium pyrrolidone, and potassium pyrrolidone, and organometallic compounds such as butyl lithium and butyl magnesium. The resin (A) can be produced by the polycondensation and the ring-opening polymerization described above. When the anionic ring-opening polymerization is used for the production of the resin (A), a polymerization accelerator is preferably further added from the viewpoint of improvement in a yield. As the polymerization accelerator, known polymerization accelerators can be used. Example of the polymerization accelerator include N-acyl-caprolactam, N-acyl-pyrrolidone, and N-acyl-azetidinone. The polymerization may be performed in a solvent or bulk polymerization may be performed without using a solvent. When the solvent is used, the solvent is not particularly limited as long as the polymerization proceeds. Solution polymerization may be performed in the good solvent of the resin (A) or suspension polymerization may be performed in the non-solvent of the resin (A).

The component for the copolymerization in the resin (A) is not particularly limited as long as the desired effects are not impaired. Examples of the component include amino acids such as 3-aminopropionic acid, 2-aminopropionic acid, alanine, glycine, and valine and lactones such as beta-propiolactone, gamma-butyrolactone, delta-valerolactone, and epsilon-caprolactone. From the viewpoint that the marine biodegradability of the polyamide fine particles (P1) is not impaired and added values such as a moisture-retaining property when the polyamide fine particles (P1) are used in the cosmetics are provided, these compounds are preferable as the component for the copolymerization of the resin (A).

Resin (B)

The resin (B) refers to a polymer resin used in the production method of the first example together with the resin (A) as one raw material for the polyamide fine particles (P1) and, in detail, an emulsion formation resin capable of forming a polymer in polymer emulsion with the resin (A) in a molten state. The polymer in polymer emulsion refers to an emulsion in a state where two kinds of resins incompatible with each other in the molten state are used and in one resin of these two kinds resins, the other resin is spherically dispersed. In the production method of the first example, the polymer in polymer emulsion is an emulsion in which a particulate (spherical) resin (A) is dispersed in the resin (B). Such polymer in polymer emulsions can be formed when the interfacial tension and melt viscosity of these two kinds of resins satisfy a specific balance.

The resin (B) in the production method of the first example is not particularly limited as long as the emulsion formation resin forms the polymer in polymer emulsion with the resin (A) in the molten state. Specific examples of such emulsion formation resins include polyethylene glycol, polypropylene glycol, polytetramethylene glycol, polypentamethylene glycol, polyhexamethylene glycol, alkyl ether products of these glycols in which a hydroxyl group or hydroxyl groups at one end or both ends are capped with, for example, methyl group, ethyl group, propyl group, isopropyl group, butyl group, hexyl group, octyl group, decyl group, dodecyl group, hexadecyl group, and octadecyl group, and alkylphenyl ether products of these glycols capped with, for example, octylphenyl group. In particular, from the viewpoint of capable of using water as the washing solvent when resin (B) is removed by washing in the collecting step described below after forming the polymer in polymer emulsion with the resin (A) and being superior in terms of economy and, above all, the environment, the resin (B) is preferably one or more of compounds selected from the group consisting of polyethylene glycol, polypropylene glycol, polytetramethylene glycol, and alkyl ether products thereof. In addition, from the viewpoint that the excellent polymer in polymer emulsions can be formed with the resin (A) in the molten state and the obtained polyamide fine particles (P1) become fine particles having high sphericity and the small standard deviation of sphericity, polyethylene glycol is the most preferable as the resin (B). As the resin (B), two or more of the emulsion formation resins described above may be used simultaneously as long as the desired effects are not impaired.

In the production method of the first example the melt viscosity of the resin (B) at 270° C. is preferably 0.40 Pa·s or more and 5.00 Pa·s or less. The resin (B) is required to have an appropriate viscosity to form the polymer in polymer emulsion with the resin (A) in the molten state. From this viewpoint, the melt viscosity of the resin (B) is preferably 0.40 Pa·s or more and 5.00 Pa·s or less. From the viewpoint that the particle diameter of the polyamide fine particles (P1) becomes not excessively coarse, the touching feeling when the polyamide fine particles (P1) are touched is excellent, and the average deviation of the coefficient of dynamical friction immediately after the start of measurement becomes small, the lower limit value of the melt viscosity of the resin (B) at 270° C. is preferably 0.40 Pa·s or more, more preferably 0.60 Pa·s or more, and further preferably 0.80 Pa·s or more. From the viewpoint that the particle diameter of the polyamide fine particles (P1) becomes not excessively small, the deterioration in the touching feeling due to coagulation when the polyamide fine particles (P1) are touched is reduced, and the average deviation of the coefficient of dynamical friction after the time elapsed can be small, the upper limit value of the melt viscosity of the resin (B) at 270° C. is preferably 5.00 Pa·s or less, more preferably 4.00 Pa·s or less, further preferably 3.00 Pa·s or less, and further more preferably 2.00 Pa·s or less.

In the production method of the first example, the melt viscosity ratio of the resin (A) and the resin (B) at 270° C. is 4.3 or more and 125.0 or less. In the production method, the formation of the polymer in polymer emulsion of the resin (A) and the resin (B) in a molten state enables the polyamide fine particles (P1) having excellent surface smoothness, high sphericity, and small variation in sphericity to be formed. Therefore, the formation of the polymer in polymer emulsion of the resin (A) and the resin (B) is essential in the preparation of the polyamide fine particles (P1) having a small average deviation of the coefficient of dynamical friction when the fine particles are rubbed together, a small average deviation of the coefficient of dynamical friction after time elapsed, and the marine biodegradability. Although the principle has not been clarified in detail, the balance between the interfacial tension and the melt viscosity of the resin (A) and the resin (B) is maintained within a suitable range only when the resin (A) and the resin (B) satisfying the conditions of the melt viscosity ratio of 4.3 to 125.0 are melt-mixed. As a result, the properties of the polyamide fine particles (P1) are obtained.

Polyamide fine particles having a melt viscosity ratio of the resin (A) and the resin (B) at 270° C. of less than 4.3 result in excessively large emulsion diameter of the resin (A) in the resin (B) in the molten state of the resin (A) and the resin (B), and due to this, the polymer in polymer emulsion of the resin (A) and the resin (B) cannot be formed. From the viewpoint of improving the smooth spreadability and less foreign matter feeling when the polyamide fine particles (P1) are touched and reducing the average deviation of the coefficient of dynamical friction immediately after the start of measurement, the melt viscosity ratio is preferably 10.0 or more, more preferably 15.0 or more, and further preferably 20.0 or more.

On the other hand, polyamide fine particles having a melt viscosity ratio of the resin (A) and the resin (B) at 270° C. of more than 125.0 result in an excessively small emulsion diameter of the resin (A) formed in the resin (B) and the stability of the emulsion of the resin (A) and the resin (B) is lost, resulting in not obtaining the polyamide fine particles (P1). From the viewpoint of improving the touching feeling when the polyamide fine particles (P1) are continuously rubbed and providing a small average deviation of the coefficient of dynamical friction after time lapsed, the melt viscosity ratio is preferably 100.0 or less, more preferably 75.0 or less, further preferably 50.0 or less, and particularly preferably 40.0 or less.

The melt viscosity of the resin (B) described above can be measured using a rheometer. Specifically, the value of the complex viscosity of the resin (B) after 5 minutes from the start of measurement measured under conditions of a temperature of 270° C. and a frequency of 1 Hz can be determined as the melt viscosity of the resin (B). Using each of the obtained melt viscosities of the resin (A) and the resin (B), the melt viscosity ratio of the resin (A) and the resin (B) at 270° C. can be calculated in accordance with Mathematical Formula (5):

$$\text{Melt viscosity ratio}=\text{Melt viscosity of resin } (B)/\text{Melt viscosity of resin } (A) \qquad \text{Mathematical Formula (5)}$$

Emulsion Formation Step

The production method of the first example includes the emulsion formation step as described above. This emulsion formation step refers to a step of melt mixing the resin (A) and the resin (B) at a temperature equal to or higher than respective milting points (melting temperature) and forming the polymer in polymer emulsion of the resin (A) and the resin (B). The emulsion formation step in the production method of the first example is hereinafter referred to as an emulsion formation step (ST1).

The melting temperature in the emulsion formation step (ST1) refers to a temperature at which the resin (A) and the resin (B) are melt-mixed. The temperature is not particularly limited as long as the temperature is equal to or more than the respective melting points of these resin (A) and resin (B) and can be selected depending the kind of resin (A). From the viewpoint of producing the polyamide fine particles (P1) having higher sphericity and smaller standard deviation of sphericity, the melting temperature is preferably equal to or more than the melting point of resin (A)+5° C. On the other hand, from the viewpoint that the degradation of the resin (A) in the state of melt mixing with resin (B) can be reduced, a stable polymer in polymer emulsion of the resin (A) and the resin (B) can be formed, and the sphericity of the obtained polyamide fine particles (P1) is improved, the upper limit value of the melting temperature is preferably 280° C. or less. From the viewpoint of improving the sphericity, the upper limit value of the melting temperature is more preferably 270° C. or less. The melt mixing time of the resin (A) and the resin (B) at the emulsion formation step (ST1) may be about 1 minute to about 10 hours.

The respective melting points of the resin (A) and the resin (B) used at the emulsion formation step (ST1) can be measured using a differential scanning calorimeter (DSC) method. For example, the melting point of the resin (A) can be measured by raising the temperature of the resin (A) from 30° C. to the temperature of an endothermic peak exhibiting the melting point of the polyamide at a rate of 20° C./minute, retaining the resin (A) for 1 minute, cooling the resin (A) after retention for 1 minute to 30° C. at a rate of 20° C./minute, and determining the temperature of an endothermic peak top when the temperature of the once cooled resin (A) is further raised at a rate of 20° C./minute as the melting point. The melting point of the resin (B) can also be measured in the same manner as the measurement of the melting point of the resin (A).

The emulsion formation step (ST1) preferably includes a temperature raising step of raising the temperature of the resin (A) and the resin (B) serving as the raw materials from room temperature to the melting temperature. Although the detailed principle is not known, the polymer in polymer emulsion of the resin (A) and the resin (B) having a more uniform and stable shape can be formed by raising the temperature of these resin (A) and resin (B) serving as the raw materials from room temperature. Therefore, from the viewpoint that the obtained polyamide fine particles (P1) have high sphericity and the standard deviation of sphericity becomes small, the emulsion formation step (ST1) preferably includes the temperature raising step.

At the emulsion formation step (ST1), the melt mixing ratio of the resin (A) and the resin (B) can be exemplified as 25:75 to 75:25, depending on the mass ratio of these resin (A) and resin (B) ((A):(B)). The melt mixing ratio of the resin (A) and the resin (B) within the above range allows the interfacial tension and the melt viscosity of the melt-mixed resin (A) and resin (B) to be maintained in balance within a suitable range, and thus the polymer in polymer emulsion of the resin (A) and the resin (B) can be formed. Therefore, the melt mixing ratio of the resin (A) and the resin (B) at the emulsion formation step (ST1) is preferably within the above range. From the viewpoint of improving the sphericity of the obtained polyamide fine particles (P1), the melt mixing ratio is more preferably 30:70 to 75:25, further preferably 40:60 to 75:25, and particularly preferably 50:50 to 75:25.

At the emulsion formation step (ST1), microscopic fine particles can be produced without stirring the molten mixture of the resin (A) and the resin (B). Stirring the molten mixture may be performed to uniformly control the volume average particle diameter and the particle size distribution of the obtained polyamide fine particles (P1). As a stirring device, known devices such as stirring blades, melt kneading machines, homogenizers, and the like can be used. Example of the types of the stirring blades include propeller, paddle, flat, turbine, cone, anchor, screw, and helical. The stirring speed depends on the kind and the melt viscosity of the resin (B). From the viewpoint that changes in the mixing ratio and the like due to adhesion of the liquid to the wall surfaces is prevented while uniform heat transfer even in large apparatus is ensured, the stirring speed is preferably 0 rpm to 2,000 rpm. The lower limit of the stirring speed is more preferably 10 rpm or more, further preferably 30 rpm or more, and particularly preferably 50 rpm or more. The upper limit of the stirring speed is more preferably 1,600 rpm or less, further preferably 1,200 rpm or less, and particularly preferably 800 rpm or less.

In the production method of the first example, at the emulsion formation step (ST1), melt mixing of the emulsion may be performed by adding additives as long as the desired effects are not impaired. Examples of the additives include surfactants, dispersing agents, antioxidants, heat stabilizers, weathering agents, lubricants, pigments, dyes, plasticizers, antistatic agents, and flame retardants. Two or more of these may be used.

The added amount of the additive can be appropriately selected and is preferably 0.00% by weight or more and 15.00% by weight or less relative to a total of resin (A) and resin (B) of 100.00% by weight. From the viewpoint of fully exhibiting the effect of the additive, the lower limit value of the added amount of the additive is more preferably 0.01% by weight or more, further preferably 0.05% by weight or more, and particularly preferably 0.10% by weight or more relative to a total of the resin (A) and the resin (B) of 100.00% by weight. From the viewpoint of reducing the amount of impurities contained in the obtained polyamide fine particles (P1), the upper limit value of the added amount of the additive is more preferably 10.00% by weight or less, further preferably 5.00% by weight or less, and further more preferably 3.00% by weight or less, and particularly preferably 1.00% by weight or less relative to a total of the resin (A) and the resin (B) of 100.00% by weight.

Immobilization Step

The production method of the first example includes the immobilization step as described above. This immobilization step refers to a step of cooling the molten mixture in which the polymer in polymer emulsion of the resin (A) and the resin (B) is formed by the emulsion formation step (ST1) to a temperature equal to or lower than a crystallization temperature of the resin (A) to immobilize this polymer in polymer emulsion (that is, to be a state where the polymer in polymer emulsion is not flowed). Hereinafter, the immobilization step in the production method of the first example is referred to as an immobilization step (ST2).

The method of cooling the molten mixture of the resin (A) and the resin (B) at the immobilization step (ST2) is not limited as long as the desired effects according to the first example are not impaired. A method of ejecting the molten mixture into a washing solution described below to quench the molten mixture in the washing solution, a method of adding the washing solution described below into a mixing apparatus after mixing the molten mixture to quench the molten mixture, a method of cooling the molten mixture by air in the mixing apparatus and thereafter ejecting or transferring the molten mixture into the washing solution described below, and a method of ejecting the molten mixture into an atmosphere and thereafter transfer into the washing solution described below can be exemplified. The cooling rate of the molten mixture is not particularly limited as long as the desired effects according to the first example are not impaired and rapid cooling or natural cooling may be used.

The immobilization step (ST2) preferably includes a retention step of retaining the temperature of the molten mixture of the resin (A) and the resin (B) in a predetermined temperature range and a cooling step of cooling the molten mixture after the retention step. This retention step refers a step of retaining the temperature $t_{mixture}$ of the molten mixture in the temperature range of more than the crystallization temperature of the resin (A) and less than the melting point of the resin (A) for 1 second to 10 minutes. The cooling step refers to a step of cooling the temperature $t_{mixture}$ of the molten mixture that has been retained in the temperature range, to a temperature equal to or less than the crystallization temperature of the resin (A). Hereafter, the retention step and the cooling step in the production method of the first example are referred to as a retention step (ST2-1) and a cooling step (ST2-2), respectively.

At the immobilization step (ST2), the resin (A) in a particulate form in the polymer in polymer emulsion of the resin (A) and the resin (B) can be efficiently immobilized in a spherical shape having high sphericity and a smooth surface by sequentially performing the retention step (ST2-1) and the cooling step (ST2-2) described above. At the retention step (ST2-1), during the period when the temperature $t_{mixture}$ of the molten mixture of the resin (A) and the resin (B) is retained in the above temperature range for 1 second to 10 minutes, the temperature $t_{mixture}$ of the molten mixture may be retained constant, raised, or lowered. At the cooling step (ST2-2), a temperature lowering rate and a cooling time are set so that the temperature $t_{mixture}$ of the molten mixture that has been retained in the above temperature range by the retention step (ST2-1) can be lowered equal to or lower than the crystallization temperature of the resin (A).

At the retention step (ST2-1), the time of retaining the temperature $t_{mixture}$ of the molten mixture in the above temperature range is preferably 1 second to 10 minutes. This is because, when the upper limit of the retention time is 10 minutes or less, the recessed porosity on the surface of the particles of the resin (A) immobilized in a particulate form is easy to be sufficiently reduced and the polyamide fine particles (P1) having high sphericity and the smooth surface can be efficiently produced. The upper limit of the retention time is more preferably 5 minutes or less, further preferably 3 minutes or less, and further more preferably 1 minute or less. The lower limit of the retention time is 1 second or more due to the operational situation of the apparatus for retaining the temperature $t_{mixture}$ of the molten mixture in the above temperature range.

Collecting Step

The production method of the first example includes the collecting step as described above. This collecting step refers to a step of washing the molten mixture of the resin (A) and the resin (B) forming the polymer in polymer emulsion immobilized by the immobilization step (ST2) with a washing solution that is a non-solvent of the resin (A), thereby washing and removing the resin (B) from the molten mixture, and collecting the polyamide fine particles (P1) formed of the resin (A). Hereinafter, the collecting step in the production method of the first example is referred to as a collecting step (ST3).

The washing solution used in the collecting step (ST3) is the non-solvent for the resin (A) as described above and is not particularly limited as long as the solvent can dissolve and remove the resin (B). Examples of such washing solutions include alcohols such as methanol, ethanol, and isopropanol (2-propanol), water-soluble ketones such as acetone, and water. Water is most preferably used as the washing solution from the viewpoint of economic aspects and environmental considerations at the time of production.

The washing method at the collecting step (ST3) is not particularly limited as long as the resin (B) can be washed and removed from the immobilized molten mixture. The method may be a method that can elute or remove the resin (B) from the molten mixture by bringing the molten mixture into contact with the washing solution. For example, as this washing method, washing methods such as reslurry washing may be employed while shear force or stirring force is applied to the molten mixture. At the collecting step (ST3), the molten mixture may be appropriately heated. The concentration of the polyamide fine particles in the washing solution when the molten mixture is washed is not particularly limited and can be exemplified as 0.01% by weight or more and 50.00% by weight or less. From the viewpoint of higher collection efficiency of the resin particles in the washing operation, the lower limit value of the concentration of the polyamide fine particles is more preferably 0.05% by weight or more, further preferably 0.10% by weight or more, further more preferably 0.50% by weight or more, and particularly preferably 1.00% by weight or more. From the viewpoint of efficient washing and removal of the resin (B) from the molten mixture in single washing, the upper limit value of the concentration of the polyamide fine particles is more preferably 40.00% by weight or less and further preferably 30.00% by weight or less.

The collecting method of the polyamide fine particles (P1) at the collecting step (ST3) is not particularly limited. Reduced pressure or pressurized filtration, decantation, centrifugal separation, and spray drying can be appropriately selected. The collected polyamide fine particles (P1) may be subjected to drying treatment, if necessary. This drying treatment is preferably performed at a temperature equal to or lower than the melting point of the polyamide fine particles (P1) and may be performed under reduced pressure. The drying method of the collected polyamide fine particles (P1) is not particularly limited. Methods such as air drying, hot air drying, heat drying, reduced pressure drying, and freeze drying may be appropriately selected.

As described above, in the first example, the polyamide fine particles (P1) that have a sphericity of 96 or more and include the polymer or the copolymer having the repeating structure unit represented by Formula (1) illustrated above as a main component are constituted. Therefore, the polyamide fine particles (P1) have the marine biodegradability and excellent true spherical shape properties and surface smoothness and thus can become the polyamide fine particles having both of the small average deviation of the coefficient of dynamical friction at the time of starting to rub the particles together and the small average deviation of the coefficient of dynamical friction when the fine particles are continuously rubbed together over time. In other words, the polyamide fine particles (P1) have the marine biodegradability and the excellent slipperiness when the polyamide fine particles (P1) are rubbed together.

Setting the standard deviation of sphericity of the polyamide fine particles (P1) to 2.00 or less allows the variation in sphericity of the polyamide fine particles (P1) to be reduced and thus a decrease in the average deviation of each of the coefficients of dynamical friction to be promoted. This can contribute to improving the slipperiness when the polyamide fine particles (P1) are rubbed together.

Setting the amount of impurities contained in the polyamide fine particles (P1) to 0.50% by weight or less or setting the stability index over time of the polyamide fine particles (P1) to 0.60 or more allows a decrease in the average deviation of the coefficient of dynamical friction after rubbing the polyamide fine particles (P1) together over time to be promoted. This can contribute to further improving the slipperiness of the polyamide fine particles (P1) after rubbing together over time. As a result, the excellent slipperiness and excellent touching feeling of the polyamide fine particles (P1) can be maintained for a longer period of time. In addition, satisfying both of the amount of impurities contained of 0.50% by weight or less and the stability index over time of 0.60 or more allows the polyamide fine particles (P1) to further promote a decrease in the average deviation of the coefficients of dynamical friction. Consequently, the slipperiness of the polyamide fine particles (P1) can be further improved. As a result, the excellent slipperiness and the excellent touching feeling of the polyamide fine particles (P1) can be maintained for a further longer period of time.

According to the method of producing the polyamide fine particles according to the first example, the polyamide fine particles (P1) having the excellent properties as described above can be produced. In particular, the polyamide fine particles (P1) can be efficiently produced by controlling the temperature of the resin (A) and the resin (B) at the time of forming the polymer in polymer emulsion and the temperature of the molten mixture at the time of immobilizing the molten mixture of these resin (A) and resin (B).

Second Example

Polyamide Fine Particles

The polyamide fine particles according to the second example are surface porous and true spherical polyamide fine particles in which the porosity r occupying on the particle surface to the BET specific surface area $A_{BET}$ ($r/A_{BET}$) is 6.0 or more and 100.0 or less and that include a polymer or a copolymer including the repeating structural units represented by Formula (1) as a main component. Therefore, the polyamide fine particles according to the second example have the marine biodegradability and a small average deviation of the coefficient of dynamical friction immediately after the start of measurement and a small average deviation of the coefficient of dynamical friction after time elapsed, and, in addition to these, have excellent lipophilic property.

Formula (1)

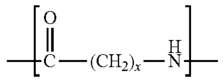

In Formula (1), x is an integer of 2 or more and 3 or less.

Hereinafter, the structure and the form constituting the polyamide fine particles according to the second example (P2) will be described below. The polyamide fine particles (P2) are fine particles including a polymer or a copolymer including a structure unit represented by Formula (1) as a main repeating structure unit. Formula (1) in the second example is the same as Formula (1) in the first example described above. Namely, when x in Chemical Formula (1) is neither 2 nor 3, the polyamide fine particles (P2) do not have sufficient marine biodegradability. From the viewpoint of the excellent handling properties of the polyamide fine particles (P2), x is preferably 3. The polyamide fine particles (P2) may include a cross-linked structure or a branched structure as long as the desired effects according to the second example are not impaired.

The ratio of the porosity r occupying the particle surface of the polyamide fine particles (P2) to the BET specific surface area $A_{BET}$ ($r/A_{BET}$) is 6.0 or more and 100.0 or less. The voids are recessed voids in the porous shape surface of the polyamide fine particles (P2). The porosity r is, for example, a proportion of voids on the particle surface to the surface area of the particle surface in a scanning electron micrograph image of the polyamide fine particles (P2) taken from an arbitrary direction. The BET specific surface area $A_{BET}$ refers to a specific surface area of the fine particles (in the second example, the polyamide fine particles (P2)) measured by the BET method. Polyamide fine particles having a ratio ($r/A_{BET}$) of less than 6.0 cause the affinity of polyamide fine particles (P2) to oil to decrease and thus, for example, the dispersion stability of the polyamide fine particles (P2) in linseed oil to decrease. Therefore, when these polyamide fine particles (P2) are blended into products such as paints and cosmetics, the dispersibility of these polyamide fine particles (P2) decreases, causing deterioration in performance due to coagulation and sedimentation of these polyamide fine particles (P2). Consequently, the usability of the products is impaired. With respect to the polyamide fine particles (P2), as the ratio ($r/A_{BET}$) becomes larger, the marine biodegradability tends to be more improved than that of other fine particles having similar values of BET specific surface area $A_{BET}$. From the viewpoint of the lipophilic property and the marine biodegradability of the polyamide fine particles (P2), the ratio ($r/A_{BET}$) is 6.0 or more, preferably 8.0 or more, more preferably 10.0 or more, and further preferably 12.0 or more. On the other hand, when the ratio ($r/A_{BET}$) exceeds 100.0, the polyamide fine particles (P2) are basically difficult to produce. Therefore, the upper limit value of the ratio ($r/A_{BET}$) is 100.0 or less.

The BET specific surface area $A_{BET}$ of the polyamide fine particles (P2) is preferably 0.8 $m^2/g$ or more and 5.0 $m^2/g$ or less. The surface smoothness of the polyamide fine particles (P2) can be represented by the BET specific surface area $A_{BET}$ by gas adsorption. As the polyamide fine particles (P2) do not have a hollow structure and the surface of the polyamide fine particles (P2) becomes smoother, the value of the BET specific surface area $A_{BET}$ becomes smaller. As the value of the BET specific surface area $A_{BET}$ becomes smaller, the deterioration in the touching feeling due to coagulation or twisting of the polyamide fine particles (P2) does not occur when the polyamide fine particles (P2) are continuously rubbed and the average deviation of the coefficient of dynamical friction after time elapsed becomes smaller. Therefore, as the BET specific surface area $A_{BET}$ becomes smaller, the polyamide fine particles (P2) become more preferable. From the viewpoint of the touching feeling when the polyamide fine particles (P2) are continuously rubbed, the upper limit value of the BET specific surface area $A_{BET}$ is preferably 5.0 $m^2/g$ or less, more preferably 4.0 $m^2/g$ or less, further preferably 3.0 $m^2/g$ or less, further more preferably 2.0 $m^2/g$ or less, and particularly preferably 1.0 $m^2/g$ or less. The polyamide fine particles having a BET specific surface area $A_{BET}$ of 0.8 $m^2/g$ or more tend to improve the marine biodegradability the of polyamide fine particles (P2). Therefore, the lower limit value of the BET specific surface area $A_{BET}$ is preferably 0.8 $m^2/g$ or more and more preferably 0.9 $m^2/g$ or more. The BET specific surface area $A_{BET}$ of the polyamide fine particles (P2) can be measured in the same manner as the manner for the polyamide fine particles (P1) in the first example described above.

The porosity r of the polyamide fine particles (P2) is, for example, the porosity occupying the particle surface in a scanning electron micrograph image of the particles taken from an arbitrary direction and is preferably 5.0% or more and 80.0% or less. The polyamide fine particles (P2) having a porosity r of 5.0% or more allow the biodegradability of the polyamide fine particulates (P2) in the sea to be slightly improved. From the viewpoint of this marine biodegradability, the lower limit value of the porosity r is preferably 5.0% or more, more preferably 10.0% or more, further preferably 20.0% or more, and further more preferably 30.0% or more. Excessively high porosity r results in not maintaining the particle shape of polyamide fine particles (P2) and tending to significantly impair the particle properties of the polyamide fine particles (P2). Therefore, to exhibit the particle properties of the polyamide fine particles (P2), the upper limit value of the porosity r is preferably 80.0% or less, more preferably 75.0% or less, and further preferably 70.0% or less.

The porosity r can be determined by observing the surface irregularities of randomly selected 50 fine particles from photographs of the fine particles taken by a scanning electron microscope at magnifications of 2,000 times to 5,000 times, calculating proportions of the recessed-part areas (that is, the area of the voids) relative to the surface area of one particle, and averaging the calculated proportions.

The sphericity of the polyamide fine particles (P2) is preferably 90 or more. When the sphericity of the polyamide fine particles (P2) is 90 or more, the average deviation of the coefficient of dynamical friction of polyamide fine particles (P2) tends to be small and the touching feeling when the polyamide fine particles (P2) are touched is improved. In addition, the polyamide fine particles (P2) are less likely to cause coagulation or twisting with each other when the polyamide fine particles (P2) are continuously rubbed. This tends to decrease the average deviation of the coefficient of dynamical friction after time elapsed and thus the feel when the polyamide fine particles (P2) are continuously used is improved. This allows the polyamide fine particles (P2) to provide smooth feel when the polyamide fine particles (P2) are used for the applications such as cosmetics and paints. From these viewpoints, the lower limit value of the sphericity of the polyamide fine particles (P2) is preferably 90 or more, more preferably 92 or more, further preferably 96 or more, further more preferably 97 or more, especially preferably 98 or more, and particularly preferably 100. Theoretically, the upper limit value of the sphericity of the polyamide fine particles (P2) is 100.

The standard deviation of sphericity of the polyamide fine particles (P2) is preferably 2.00 or less. The polyamide fine particles having a standard deviation of sphericity of 2.00 or less allow the deterioration in the touching feeling due to coagulation or twisting to be less likely to occur when the polyamide fine particles (P2) are continuously rubbed and thus the average deviation of the coefficient of dynamical friction after time elapsed to be small. This provides smooth feel when the polyamide fine particles (P2) are used for the applications for cosmetics and paints. The standard deviation of sphericity of the polyamide fine particles (P2) is more preferably 1.75 or less, further preferably 1.50 or less, further more preferably 1.30 or less, and particularly preferably 1.10 or less. With respect to the polyamide fine particles (P2), theoretically, the lower limit value of the standard deviation of sphericity is 0.

The sphericity and the standard deviation of sphericity of the polyamide fine particles (P2) are calculated in accordance with Mathematical Formulae (1) and (2), respectively, similar to those of the polyamide fine particles (P1) in the first example described above.

The volume average particle diameter of the polyamide fine particles (P2) is preferably 0.1 μm or more and 100.0 μm or less. The polyamide fine particles (P2) having a volume average particle diameter of 100.0 μm or less allow the feel when the polyamide fine particles (P2) are touched to be excellent and the standard deviation of the coefficient of dynamical friction immediately after the start of measurement to be small, which is preferable. The upper limit value of the volume average particle diameter of the polyamide fine particles (P2) is more preferably 50.0 μm or less, further preferably 30.0 μm or less, further more preferably 15.0 μm or less, especially preferably 13.0 μm or less, and particularly preferably 10.0 μm or less. The polyamide fine particles (P2) having a volume average particle diameter of 0.1 μm or more allow the coagulation of the polyamide fine particles (P2) with each other to be less likely to occur, deterioration in the feel caused by the coagulation to be reduced, and the average deviations of the coefficients of dynamical friction immediately after the start of measurement and after time elapsed to be small, which is preferable. The lower limit value of the volume average particle diameter of the polyamide fine particles (P2) is more preferably 0.3 μm or more, further preferably 0.5 μm or more, and particularly preferably 1.0 μm or more.

A particle size distribution index indicating the particle size distribution of the polyamide fine particles (P2) is preferably 3.0 or less. The polyamide fine particles (P2) having a particle size distribution index of 3.0 or less allow flowability to be excellent and slipperiness to be better in the applications using the polyamide fine particles (P2) such as paints and cosmetics. The particle size distribution index of the polyamide fine particles (P2) is more preferably 2.0 or less, further preferably 1.5 or less, further more preferably 1.3 or less, and particularly preferably 1.2 or less. Theoretically, the lower limit value of the particle size distribution index of the polyamide fine particles (P2) is 1.0.

The volume average particle diameter and number average particle diameter of the polyamide fine particles (P2) refer to those measured by a laser scattering particle size distribution analyzer that is the same as those for the polyamide fine particles (P1) in the first example described above. The particle size distribution index of the polyamide fine particles (P2) is calculated in accordance with Mathematical Formula (3) in the same manner as the manner for the polyamide fine particles (P1) of the first example.

The weight average molecular weight of the polyamide fine particles (P2) is preferably 2,000 or more and 2,000,000 or less. The polyamide fine particles (P2) having a weight average molecular weight of 2,000 or more allow the deterioration in the touching feeling due to coagulation or twisting of the polyamide fine particles (P2) to be less likely to occur when the polyamide fine particles (P2) are continuously rubbed and thus the average deviation of the coefficient of dynamical friction after time elapsed to be small, which is preferable. The lower limit value of the weight average molecular weight of the polyamide fine particles (P2) is more preferably 3,000 or more, further preferably 4,000 or more, and further more preferably 5,000 or more. The polyamide fine particles (P2) having a weight average molecular weight of 2,000,000 or less allow the standard deviation of the coefficient of dynamical friction immediately after the start of measurement to be small and the touching feeling at the time of rubbing the polyamide fine particles (P2) together to be excellent, which is preferable. The upper limit value of the weight average molecular weight of the polyamide fine particles (P2) is more preferably 1,000,000 or less, further preferably 500,000 or less, further more preferably 100,000 or less, especially preferably 50,000 or less, and particularly preferably less than 30,000. The weight average molecular weight of the polyamide fine particles (P2) can be measured in the same manner as the manner for the polyamide fine particles (P1) in the first example.

The amount of impurities contained in the polyamide fine particles (P2) is preferably 0.50% by weight or less when the total weight of the polyamide fine particles (P2) is determined to be 100.00% by weight. The impurities contained in the polyamide fine particles (P2) are components other than the resin (A) included in the polyamide fine particles (P2) and the same components as the components in the polyamide fine particles (P1) in the first example are exemplified. The polyamide fine particles (P2) having an amount of impurities contained of 0.50% by weight or less allow the deterioration in the touching feeling due to coagulation or twisting of the polyamide fine particles (P2) to be less likely to occur and the average deviation of the coefficient of dynamical friction after time elapsed to be small when the polyamide fine particles (P2) are continuously rubbed. Therefore, when the polyamide fine particles (P2) are used for the applications of cosmetics and paints, smooth feel can be provided, which is preferable. The amount of impurities contained in the polyamide fine particles (P2) is more preferably 0.30% by weight or less and further preferably 0.10% by weight or less. Theoretically, the lower limit value of the amount of impurities contained in the polyamide fine particles (P2) is 0.00% by weight. The amount of impurities contained in the polyamide fine particles (P2) can be determined in the same manner as the manner for the polyamide fine particles (P1) in the first example.

The stability index over time of the polyamide fine particles (P2) is an index defined in the same manner as the manner in the first example and is preferably 0.60 or more. As the stability index over time of the polyamide fine particles (P2) becomes larger, the excellent feel can be maintained longer even when the polyimide fine particles (P2) are rubbed for a long period of time. For example, when the polyamide fine particles (P2) are used for the cosmetic application, the excellent touching feeling of the polyamide fine particles (P2) can be maintained for a long period of time. In particular, when the stability index over time is 0.60 or more, the deterioration in the touching feeling due to coagulation or twisting of the polyamide fine particles (P2) is less likely to occur and the average deviation of the coefficient of dynamical friction after time elapsed is small when the polyamide fine particles (P2) are continuously rubbed, which is preferable. The lower limit value of the stability index over time of the polyamide fine particles (P2) is more preferably 0.70 or more and further preferably 0.80 or more. The stability index over time of the polyamide fine particles (P2) is calculated by Mathematical Formula (4), which is the same manner as the manner for the polyamide fine particles (P1) in the first example. At this time, in Mathematical Formula (4), s is the standard deviation of sphericity of the polyamide fine particles (P2) and the amount of impurities contained is the amount of impurities contained in polyamide fine particles (P2).

The polyamide fine particles (P2) have the marine biodegradability defined in the same manner as the manner for the polyamide fine particles (P1) in the first example described above. From the viewpoint of exhibiting the excellent marine biodegradability of the polyamide fine particles (P2), the lower limit of the marine biodegradability of the polyamide fine particles (P2) is preferably 15% or more, more preferably 20% or more, and further preferably 30% or more. Excessively high marine biodegradability causes a period when the polyamide fine particles (P2) can be used as products (the product lifetime of the polyamide fine particles (P2)) to be shortened. Therefore, the upper limit of the marine biodegradability of the polyamide fine particles (P2) is preferably 90% or less and more preferably 80% or less.

Method of Producing Polyamide Fine Particles

Subsequently, the method of producing the polyamide fine particles according to the second example will be described in detail. The polyamide fine particles (P2) can be produced by the method of producing according to the example.

In detail, the method of producing the polyamide fine particles according to the second example (the production method of the second example) refers to a method of producing the polyamide fine particles (P2) using the resin (A) that is a polymer or a copolymer including the repeating structure unit represented by Formula (1) as the main component and the resin (B) that is an emulsion formation resin capable of forming an emulsion with the resin (A) in a molten state serving as the raw materials. The production method of the second example includes an emulsion formation step, an immobilization step, and a collecting step. The emulsion formation step refers to a step of melt mixing the resin (A) and the resin (B) at a temperature equal to or more than respective melting points (melting temperature) and forming an emulsion (a polymer in polymer emulsion) in which the resin (A) in a particulate form is dispersed in the resin (B). The immobilization step refers to a step of cooling a molten mixture in which the emulsion is formed of the resin (A) and the resin (B) to a temperature equal to or lower than a crystallization temperature of the resin (A) to immobilize the emulsion. The collecting step refers to a step of washing and removing the resin (B) in the immobilized molten mixture with a washing solution that is a non-solvent of the resin (A) to collect the polyamide fine particles (P2) formed of the resin (A). In this production method of the second example, the melt viscosity ratio of the resin (A) to the resin (B) at 270° C. is 4.3 or more and 125.0 or less.

Resin (A) and Resin (B)

In the production method of the second example, the resin (A) and the resin (B), which are raw materials for the polyamide fine particles (P2), are the same as the resin (A) and the resin (B), respectively, in the production method of the first example.

For example, the resin (A) of the second example is a polymer or a copolymer including the repeating structure unit represented by Formula (1) as the main component and may include a cross-linked structure or a branched structure as long as the desired effects according to the second example are not impaired. The resin (A) of the second example has the same melt viscosity at 270° C., method of deriving the melt viscosity, polymerization method, and components of copolymerization as those in the first example.

The resin (B) of the second example is the emulsion formation resin that can form the polymer in polymer emulsion with the resin (A) in the molten state, which is the same emulsion formation resin as the resin in the first example. Specific examples of this resin (B) include the same resin as the resin in the first example. In particular, the most preferable specific examples of the resin (B) include polyethylene glycol, which is the same resin as the resin in the first example above. The melt viscosity of this resin (B) at 270° C. and the method of deriving the melt viscosity are the same as those in the first example. For example, the melt viscosity is preferably 0.40 Pa·s or more and 5.00 Pa·s or less.

In the production method of the second example, the melt viscosity ratio of the resin (A) and the resin (B) at 270° C. is 4.3 or more and 125.0 or less. In the production method, formation of the polymer in polymer emulsion of the resin (A) and the resin (B) in the molten state enables the polyamide fine particles (P2) in which although the surface has a porous shape, the sphericity is moderately high and variation in sphericity is small to be formed. Therefore, this production method is essential in the preparation of the polyamide fine particles (P2) having a small average deviation of the coefficient of dynamical friction when the fine particles are rubbed together, a small average deviation of the coefficient of dynamical friction after time elapsed, and the marine biodegradability. Although the principle has not been clarified in detail, the balance between the interfacial tension and the melt viscosity of the resin (A) and the resin (B) is maintained within a suitable range only when the resin (A) and the resin (B) satisfying the conditions of the melt viscosity ratio of 4.3 to 125.0 are melt-mixed. As a result, the properties of the polyamide fine particles (P2) are obtained.

Polyamide fine particles having a melt viscosity ratio of the resin (A) and the resin (B) at 270° C. of less than 4.3 result in excessively large emulsion diameter of the resin (A) in the resin (B) in the molten state of the resin (A) and the resin (B), and due to this, the polymer in polymer emulsion of the resin (A) and the resin (B) cannot be formed. From the viewpoint of improving the smooth spreadability and less foreign matter feeling when the polyamide fine particles (P2) are touched and reducing the average deviation of the coefficient of dynamical friction immediately after the start of measurement, the melt viscosity ratio is preferably 10.0 or more, more preferably 15.0 or more, and further preferably 20.0 or more.

On the other hand, polyamide fine particles having a melt viscosity ratio of the resin (A) and the resin (B) at 270° C. of more than 125.0 result in an excessively small emulsion diameter of the resin (A) formed in the resin (B) and the stability of the emulsion of the resin (A) and the resin (B) is lost, resulting in not obtaining the polyamide fine particles (P2). From the viewpoint of improving the touching feeling when the polyamide fine particles (P2) are continuously rubbed and providing a small average deviation of the coefficient of dynamical friction after time lapsed, the melt viscosity ratio is preferably 100.0 or less, more preferably 75.0 or less, further preferably 50.0 or less, and particularly preferably 40.0 or less. The melt viscosity ratio in the second example can be calculated in accordance with the same Mathematic Formula (5) as the formula in the first example.

Emulsion Formation Step

The production method of the second example includes the emulsion formation step as described above. Hereinafter, the emulsion formation step in the production method of the second example is referred to as an emulsion formation step (ST11). This emulsion formation step (ST11) refers to a step of melt mixing the resin (A) and the resin (B) at a melting temperature equal to or more than respective milting points and forming the polymer in polymer emulsion of the resin (A) and the resin (B), which is the same as the emulsion formation step (ST1) in the first example.

For example, the melting temperature at the emulsion formation step (ST11) is the temperature at which the resin (A) and the resin (B) are melt-mixed and can be selected depending on the kind of resin (A), which is the same as the emulsion formation step (ST1) in the first example. From the viewpoint of preparing the polyamide fine particles (P2) having a porous surface, higher sphericity, and smaller standard deviation of sphericity, the melting temperature is preferably equal to or more than the melting point of resin (A)+5° C. On the other hand, from the viewpoint that the degradation of the resin (A) in the state of melt mixing with resin (B) can be reduced, a stable polymer in polymer emulsion of the resin (A) and the resin (B) can be formed, and the sphericity of the obtained polyamide fine particles (P2) is improved, the upper limit value of the melting temperature is preferably 280° C. or less. From the viewpoint of improving the sphericity, the upper limit value of the melting temperature is more preferably 270° C. or less.

From the viewpoint that the obtained polyamide fine particles (P2) have high sphericity and the standard deviation of sphericity is small, the emulsion formation step (ST11) preferably includes the temperature raising step of raising the temperature of the resin (A) and the resin (B) serving as the raw materials from room temperature to the melting temperature, which is the same as the emulsion formation step (ST1) in the first example.

At the emulsion formation step (ST11), microscopic fine particles can be produced without stirring the molten mixture of the resin (A) and the resin (B). Stirring the molten mixture may be performed to uniformly control the volume average particle diameter and the particle size distribution of the obtained polyamide fine particles (P2). The stirring apparatus and the stirring speed are the same as those at the emulsion formation step (ST1) of the first example.

At the emulsion formation step (ST11), the melt mixing time of the resin (A) and the resin (B) and the method of deriving the respective melting points of the resin (A) and the resin (B) are the same as those at the emulsion formation step (ST1) of the first example. At the emulsion formation step (ST11), the melt mixing ratio of the resin (A) and the resin (B) and the addition of additives when the resin (A) and the resin (B) are melt-mixed are the same as those at the emulsion formation step (ST1) of the first example.

Immobilization Step

The production method of the second example includes the immobilization step as described above. This immobilization step refers to a step of cooling a molten mixture in which the polymer in polymer emulsion of the resin (A) and the resin (B) formed by the emulsion formation step (ST11) to a temperature equal to or lower than a crystallization temperature of the resin (A) to immobilize the polymer in polymer emulsion. Hereinafter, the immobilization step in the production method of the second example is referred to as an immobilization step (ST12).

The immobilization step (ST12) preferably includes a retention step and a cooling step described below. This retention step refers to a step of retaining the temperature $t_{mixture}$ of the molten mixture of the resin (A) and the resin (B) in the temperature range of more than the crystallization temperature of the resin (A) and less than the melting point of the resin (A). The cooling step refers to a step of cooling the temperature $t_{mixture}$ of the molten mixture that has been retained in the temperature range, to a temperature equal to or less than the crystallization temperature of the resin (A). Hereafter, the above retention step and cooling step in the production method of the second example are referred to as a retention step (ST12-1) and a cooling step (ST12-2), respectively.

At the immobilization step (ST12), the resin (A) in a particulate form in the polymer in polymer emulsion of the resin (A) and the resin (B) can be efficiently immobilized in a true spherical shape having a porous surface by sequentially performing the retention step (ST12-1) and the cooling step (ST12-2) described above.

At the retention step (ST12-1) in the immobilization step (ST12), the temperature $t_{mixture}$ of the molten mixture of the resin (A) and the resin (B) is preferably retained in the above temperature range for 30 minutes to 10 hours. At the retention step (ST12-1), the temperature $t_{mixture}$ of the molten mixture may be retained constant, raised, or lowered for the period of time when the temperature $t_{mixture}$ of the molten mixture is retained as described above.

At the retention step (ST12-1), when the retention time of the temperature $t_{mixture}$ of the molten mixture in the above temperature range is 30 minutes or longer, the crystallization of the resin (A) proceeds while the shape of the emulsion formed in the emulsion formation step (ST11) described above is maintained, whereby the polyamide fine particles (P2) having a wound yarn-like true spherical shape with a porous surface can be produced. Therefore, the lower limit value of the retention time of the temperature $t_{mixture}$ is preferably 30 minutes or more. From the viewpoint of increasing the porosity r on the surface of polyamide fine particles (P2), the lower limit value of the retention time of the temperature $t_{mixture}$ is more preferably 45 minutes or more and further preferably 60 minutes or more. When the retention time of the temperature $t_{mixture}$ of the molten mixture in the above temperature range is 10 hours or less, the progress of degradation of the crystallized resin (A) can be inhibited, whereby the sphericity of the polyamide fine particles (P2) is improved and the standard deviation of sphericity is lowered. Therefore, the upper limit value of the retention time of the temperature $t_{mixture}$ is preferably 10 hours or less, more preferably 8 hours or less, further preferably 5 hours or less, further more preferably 3 hours or less, and particularly preferably 2 hours or less.

When the retention time of the temperature $t_{mixture}$ of the molten mixture in the above temperature range is more than 10 hours or less than 30 minutes, the polyamide fine particles (P1) having a smooth surface and a high true spherical shape in the first example and the surface porous and true spherical polyamide fine particles (P2) in this second example will be mixed. As a result, the respective properties of these polyamide fine particles (P1) and polyamide fine particles (P2) are inhibited. Therefore, a retention time at the temperature $t_{mixture}$ of more than 10 hours or less than 30 minutes is not preferable.

At the cooling step (ST12-2) in the immobilization step (ST12), a temperature lowering rate and a cooling time are set so that the temperature $t_{mixture}$ of the molten mixture that has been retained in the above temperature range by the retention step (ST12-1) can be lowered equal to or less than the crystallization temperature of the resin (A).

As the cooling method of the molten mixture of the resin (A) and the resin (B) at the immobilization step (ST12), any method can be used as long as the method does not impair the desired effects of the second example. Examples of the cooling method include the same specific examples as the specific examples in the immobilization step (ST2) in the first example.

Collecting Step

The production method of the second example includes the collecting step as described above. This collecting step refers to a step of washing the molten mixture of the resin (A) and the resin (B) forming the polymer in polymer emulsion immobilized by the immobilization step (ST12) with a washing solution that is a non-solvent of the resin (A), thereby washing and removing the resin (B) from the molten mixture, and collecting the polyamide fine particles (P2) formed of the resin (A). Hereinafter, the collecting step in the production method of the second example is referred to as a collecting step (ST13).

The washing solution, washing method, and method of collecting the polyamide fine particles (P2) at the collecting step (ST13) are the same as those in the collecting step (ST3) in the first example.

As described above, the second example constitutes the polyamide fine particles (P2) having a ratio ($r/A_{BET}$) of the porosity r occupying the particle surface and the BET specific surface area $A_{BET}$ of 6.0 or more and 100.0 or less and include the polymer or the copolymer including the repeating structure unit represented by Formula (1) as the main component. Therefore, compared to other fine particles having the same level of the BET specific surface are $A_{BET}$, the polyamide fine particles (P2) may be polyamide fine particles having the excellent marine biodegradability, excellent lipophilic property, and both of the small average deviation of the coefficient of dynamical friction at the time of starting to rub the particles together and the small average deviation of the coefficient of dynamical friction when the fine particles are continuously rubbed together over time. In other words, the polyamide fine particles (P2) have the excellent marine biodegradability and the lipophilic property as well as excellent slipperiness when rubbed together.

Setting the standard deviation of sphericity of the polyamide fine particles (P2) to 2.00 or less allows the variation in sphericity of the polyamide fine particles (P2) to be reduced and thus a decrease in the average deviation of each of the coefficients of dynamical friction to be promoted. This can contribute to improving the slipperiness of the polyamide fine particles (P2) when the polyamide fine particles (P2) are rubbed together.

In addition, setting the BET specific surface area $A_{BET}$ of polyamide fine particles (P2) to 0.8 $m^2/g$ or more and 5.0 $m^2/g$ or less allows the decrease in the average deviation of each of the above coefficients of dynamical friction to be promoted to contribute to improving the slipperiness when the polyamide fine particles (P2) are rubbed together as well as the marine biodegradability to be improved.

According to the method of producing polyamide fine particles according to the second example, the polyamide fine particles (P2) having the excellent properties as described above can be produced. In particular, controlling the temperature of the molten mixture when the molten mixture (the polymer in polymer emulsion) of the resin (A) and the resin (B) serving as the raw materials is immobilized allows the polyamide fine particles of the first example (P1) and the polyamide fine particles of the second example (P2) to be separately prepared to efficiently produce the target polyamide fine particles (P2).

Applications

The polyamide fine particles (P1) according to the first example and the polyamide fine particles (P2) according to the second example have marine biodegradability, excellent sphericity, and small average deviations of the coefficients of dynamical friction immediately after the start of measurement and time elapsed. The average deviation of the coefficient of dynamical friction immediately after the start of measurement refers to a value indicating the feel of the polyamide fine particles immediately after touching the polyamide fine particles. As the average deviation of the coefficient of dynamical friction immediately after the start of measurement becomes smaller, the foreign matter feeling and roughness feeling when the polyamide fine particles are rubbed together with a finger become less and the feel when the polyamide fine particles are touched becomes more excellent. This allows the polyamide fine particles (P1) and the polyamide fine particles (P2) having a small average deviation of the coefficient of dynamical friction immediately after the start of measurement to be suitably used for, for example, cosmetic applications. The average deviation of the coefficient of dynamical friction after time elapsed refers to a value indicating the presence or absence of the deterioration in the touching feeling due to coagulation and twisting when the polyamide fine particles are continuously rubbed. As the average deviation of the coefficient of dynamical friction after time elapsed becomes smaller, deterioration in the touching feeling due to coagulation and twisting of the polyamide fine particles becomes further less likely to occur. These allow the smooth spreadability of the product to be maintained for a long period of time and excellent feel to be provided when the polyamide fine particles (P1) and the polyamide fine particles (P2) are appropriately used for the applications for cosmetics and paints.

The polyamide fine particles (P1) according to the first example and the polyamide fine particles (P2) according to the second example have high sphericity and small average deviations of the coefficients of dynamical friction immediately after measurement and after time elapsed. Therefore, when these particles are blended in cosmetics, in addition to providing smooth spreadability when the cosmetics are used, a soft-focus effect in which unevenness of a skin is filled and the appearance of wrinkles becomes less noticeable by scattering light in various directions can be provided. Furthermore, the polyamide fine particles (P2) also have excellent lipophilic property and thus have excellent affinity with oils when blended in cosmetics and further improve the feel.

Examples of the cosmetic applications include skin topical agents and hair topical agents intended mainly for cosmetic purposes such as foundations such as liquid foundations and powder foundations, concealers, sunscreens, makeup bases, lipsticks and lipstick bases, white powders such as body powders, solid white powders, and face powders, solid powder eye shadows, wrinkle concealment creams, and skin care lotions. Dosage forms thereof are not limited. The dosage forms may be any of liquid formulations such as aqueous solutions, milky lotions, and suspension liquids, semi-solid formulations such as gels and creams, and solid formulations such as powders, granules, and solids. In addition, examples of the dosage forms include emulsions such as creams and milky lotions, oil gels such as lipsticks, powder cosmetics such as foundations, and aerosol cosmetics such as hair styling agents.

In addition to cosmetic applications, the polyamide fine particles (P1) and the polyamide fine particles (P2) described above can also be used in applications that take advantage of the true spherical shape properties such as paint applications used for buildings, automobiles, metal products, and electrical appliances and toner applications for laser printers and copy machines. There is no limitation to the applications.

The polyamide fine particles (P1) and the polyamide fine particles (P1) are produced by each of the above-described production methods of the first and second examples. In particular, the polyamide fine particles having a small average deviation of the coefficient of dynamical friction when the fine particles are rubbed together, a small average deviation of the coefficient of dynamical friction after time elapsed, and the marine biodegradability, which have been difficult to produce until now, can be easily produced.

<

EXAMPLES

Hereinafter, our fine particles and methods will be described in more detail with reference to Examples. This disclosure, however, is not limited by the Examples. The used materials, evaluation items, and evaluation methods thereof in Examples and Comparative Examples are as follows.

Sphericity and Standard Deviation of Sphericity

The sphericity and the standard deviation of sphericity of polyamide fine particles were determined by observing randomly selected 50 polyamide fine particles from photographs of the polyamide fine particles taken by a scanning electron microscope under the following conditions and calculating from the minor axis and major axis of the particles in accordance with Mathematical Formulae (1) and (2) described below. The sphericity value was represented as an integer by rounding off. For example, when the value was 99.5 or higher, the sphericity value was represented as 100.

Conditions

Apparatus: TM1000 miniscope manufactured by Hitachi High-Tech Corporation

Magnification for image: 2,000 times to 5,000 times $$T = \left(\frac{1}{n}\sum_{i=1}^{n}\frac{b_i}{a_i}\right)\times 100 \quad \text{Mathematical Formula (1)}$$

T: (average of) sphericity, $a_i$: major axis of each polyamide fine particle, $b_i$: minor axis of each polyamide fine particle, n: number of measurements.

$$s = \sqrt{\frac{1}{n}\sum_{i=1}^{n}(T_i - T)^2} \quad \text{Mathematical Formula (2)}$$

s: standard deviation of sphericity, $T_i$: sphericity of each polyamide fine particle, T: (average of) sphericity, n: number of measurements.

In the Examples and Comparative Examples, n=50 was used as the number of measurements in Mathematical Formulae (1) and (2) when the sphericity of the polyamide fine particles and the standard deviation of sphericity were derived.

BET Specific Surface Area

The BET specific surface area $A_{BET}$ of the polyamide fine particles was calculated by the BET method by measuring the krypton gas adsorption isotherm line at liquid nitrogen temperature in accordance with "Measuring methods for the specific surface area by gas adsorption using the BET method" in Japanese Industrial Standard (JIS Standard) JIS R1626 (1996) under the following conditions.

Conditions

Apparatus: BELSORP-max manufactured by MicrotracBEL Corp.

Gas: Krypton gas

Sample amount: About 0.2 g

Pretreatment: 80° C., deaeration under reduced pressure for about 5 hours

Porosity r and ratio ($r/A_{BET}$)

The porosity r on the surface of the polyamide fine particles was calculated based on randomly selected 50 polyamide fine particles from the photograph of the polyamide fine particles taken by a scanning electron microscope under the following conditions. At this time, the surface of each polyamide fine particle was binarized using image analysis software and the proportion of the recessed area to the surface area of each polyamide fine particle was calculated. The target porosity r was determined from the average value of the calculated proportions.

Conditions

Apparatus: TM1000 miniscope manufactured by Hitachi High-Tech Corporation

Magnification for image: 2,000 times to 5,000 times

Image analysis software: Winroof

The ratio of the porosity r and the BET specific surface area $A_{BET}$ ($r/A_{BET}$) was calculated by dividing the porosity r calculated as described above by the BET specific surface area $A_{BET}$ value.

Volume Average Particle Diameter and Particle Size Distribution Index

The volume average particle diameter and the number average particle diameter of the polyamide fine particles were determined under the following conditions. The particle size distribution index was calculated in accordance with Mathematical Formula (3) using each of the values of the volume average particle diameter and the number average particle diameter obtained above.

Conditions

Apparatus: Laser scattering particle size distribution analyzer (Microtrac MT3300EXII) manufactured by NIKKISO CO., LTD.

Dispersion medium: Water

Flow rate: 50%

Number of washes: 3

Ultrasonic wave output: 40 W

Ultrasonic wave irradiation time: 180 seconds

Defoaming frequency: 3 times

Particle size distribution index=Volume average particle diameter/Number average particle diameter   Mathematical Formula (3)

Melting Point and Crystallization Temperature

The melting point and the crystallization temperature of the resin (A) serving as one raw material of the polyamide fine particles were measured under the following conditions: the top of the exothermic peak appearing at a step (c) of the temperature program described below was determined to be the crystallization temperature and the endothermic peak at a step (e) of the temperature program described below was determined to be the melting point.

Conditions

Apparatus: Differential Scanning calorimeter (DSCQ20) manufactured by TA Instruments Japan Inc.

Sample amount: 10 mg

Atmosphere: Under nitrogen flow

Temperature program

Step (a) Temperature rising from 30° C. to an endothermic peak indicating the melting point of the polyamide Step (b) Retention for 1 minute Step (c) Temperature lowering to 30° C.

Step (d) Retention for 1 minute

Step (e) Temperature rising from 30° C. to an endothermic peak indicating the melting point of the polyamide Temperature rising/lowering rate: 20° C./min Melt Viscosity and Melt Viscosity Ratio As the melt viscosities of the resin (A) and the resin (B) serving as the raw materials for polyamide fine particles, values measured after 5 minutes from the start of the measurement of the melt viscosities under the following conditions were determined as each of the melt viscosities. Using each of the obtained melt viscosities, the melt viscosity ratio of the resin (B) and the resin (A) was calculated using Mathematical Formula (5).

Conditions

Apparatus: Physica MCR501 manufactured by Anton Paar GmbH

Measuring jig: Parallel plate (PP25, diameter 25 mm)

Measurement position: 1.0 mm

Frequency: 1 Hz

Temperature condition: 270° C.

Melt viscosity ratio=Melt viscosity of resin (*B*)/Melt viscosity of resin (*A*)   Mathematical Formula (5)

Amount of Impurities Contained

The amount of impurities contained in the polyamide fine particles was determined by measuring the respective organic substances other than the resin (A) and inorganic substances included in the polyamide fine particles under the following conditions and the total amount thereof was determined as the amount of impurities contained. When the amount of impurities contained was significantly less than 0.1% by weight and could not be detected, the result was noted as "Undetectable."

In the amount of impurities contained in the polyamide fine particles, the content of the organic substances was determined by $^1$H-NMR under the following conditions.

Conditions

Apparatus: 500 MHz nuclear magnetic resonance spectrometer manufactured by JEOL Ltd.

Nuclide: $^1$H

Sample concentration: About 1% by weight

Solvent: $D_2SO_4$

Number of cumulative times: 256 times

In the amount of impurities contained in the polyamide fine particles, the content of the inorganic substances was determined by calcining about 5 g of the polyamide fine particles in an electric furnace under the following conditions, thereafter cooling the polyamide fine particles after the calcination, and weighing the collected ash.

Conditions

Apparatus: TMF-5 manufactured by THOMAS KAGAKU Co., Ltd.

Ashing temperature: 550° C.

Ashing time: 6 hours

Weight average molecular weight

As the weight average molecular weight of the polyamide fine particles, a solution obtained by dissolving 0.5 g of the polyamide fine particles in 4 mL of HFIP (0.005 N sodium trifluoroacetate was added) and filtering the solution through a filter having a pore size of 0.45 μm was measured to determine the weight average molecular weight under the following conditions.

Conditions

Apparatus: Gel permeation chromatography (manufactured by Waters corporation)

Detector: Waters 410 refractive index detector (Waters)

Columns: Shodex GPC HFIP-806M (2 columns)+HFIP-LG (manufactured by SHIMADZU GLC Ltd.)

Flow rate: 0.5 mL/min

Sample injection volume: 0.1 mL

Temperature: 30° C.

Molecular weight calibration: Polymethyl methacrylate (PMMA)

Stability Index Over Time

The stability index over time of the polyamide fine particles was determined in accordance with Mathematical Formula (4) using the standard deviation of sphericity and the amount of impurities contained as described above. When the amount of impurities contained was not detectable, the stability index over time of the polyamide fine particles was calculated using the amount of impurities contained in Mathematical Formula (4) as 0.0:

Stability index over time=1/(s×(Amount of impurities contained+1)). Mathematical Formula (4)

s: Standard deviation of sphericity.

Marine Biodegradability

The marine biodegradability of the polyamide fine particles was evaluated from BOD measurements by blending 100 mg of the polyamide fine particles in 100 g of soil in accordance with the Japanese Industrial Standard (JIS standard) JIS K6955 (2006). When the polyamide fine particles indicated 10% or more of degradation after two months from the start of the test, the polyamide fine particles were determined to have the marine biodegradability.

Coefficient of Dynamical Friction During Rubbing of Fine Particles

As the index of the feel of the polyamide fine particles, the average deviation of the coefficients of dynamical friction measured in 10 measurements was determined by applying the polyamide fine particles to a sample stand so that the applied polyamide fine particles were flat and smooth and moving the sample stand to measure the coefficients of dynamical friction under the following conditions.

Conditions

Apparatus: KES-SE-STP Friction Sensitivity Tester manufactured by KATO TECH CO., LTD.

Sample amount: 0.01 g

Sample area: 2 cm×10 cm

Specimen table movement speed: 1 mm/min

The feel of the polyamide fine particles immediately after touching can be indicated by the average deviation of the coefficient of dynamical friction immediately after the start of the above measurement (hereinafter referred to as an average deviation of the coefficient of dynamical friction immediately after). As the average deviation of the coefficient of dynamical friction immediately after touching became smaller, smoother and more excellent feel having less foreign matter feeling and roughness feeling is provided when the polyamide fine particles are rubbed together with fingers.

The presence or absence of the deterioration in the touching feeling due to coagulation and twisting of the polyamide fine particles when the polyamide fine particles are continuously rubbed can be indicated by the average deviation of the coefficient of dynamical friction after 5 minutes from the start of the above measurement (average deviation of the coefficient of dynamical friction after 5 minutes). As the average deviation of the coefficient of dynamical friction after 5 minutes becomes smaller, deterioration in touching feeling due to coagulation or twisting of the polyamide fine particles do not occur and smoother and more excellent feel can be provided when the polyamide fine particles are used for the applications such as cosmetics and paints.

Dispersion Stability in Linseed Oil

As an index of lipophilic property of the polyamide fine particles, the dispersion stability of the polyamide fine particles in linseed oil was evaluated. In this evaluation, the polyamide fine particles were dispersed in linseed oil, and thereafter the transmittance in the linseed oil immediately after dispersion and the transmittance in the linseed oil after allowing to stand for 1 day after the dispersion were measured under the following conditions. The difference therebetween was determined by Mathematical Formula (6).

Conditions

Apparatus: TURBISCAN Lab manufactured by Sanyo Trading Co., Ltd.

Sample amount: 2 g

Amount of linseed oil: 18 g

Sample bottle capacity: 20 mL

Measuring point: 3 mm height above the bottom of the sample bottle

Dispersion stability in linseed oil=Transmittance immediately after dispersion−Transmittance after 1 day elapsed Mathematical Formula (6)

As the difference in the transmittances becomes smaller, better lipophilic property of the polyamide fine particles is exhibited. When the difference in the transmittances is 20 or less, the polyamide fine particles have sufficiently high lipophilic property. High lipophilic property allows a stable dispersion state in an oil agent to be maintained when the polyamide fine particles are blended in the oil agent and thus the properties of the polyamide fine particles can be exhibited without impairing.

Reference Example 1

In Reference Example 1, a resin (A)-1 was synthesized as an example of the resin (A) serving as one raw material for the polyamide fine particles. Specifically, in an oil bath at 50° C., 2-pyrrolidone (127.7 g (1,500 mmol)) from which water was removed by purification and potassium t-butoxide (3.37 g (30 mmol)) were placed into a 500-mL flask and the resultant mixture was uniformly dissolved. 1-acetyl-2-caprolactam (3.46 g (30 mmol)) was added as an initiator and the inside of the system was replaced with nitrogen. Thereafter, polymerization was performed for 4 hours to give a mass product. The obtained mass product was crushed, thereafter washed with ethanol, and dried at 80° C. under vacuum for 24 hours to give the resin (A)-1 as a 2-pyrrolidone polymer having a melting point of 263° C., a crystallization temperature of 232° C., and a melt viscosity of 0.04 Pa·s.

Reference Example 2

In Reference Example 2, a resin (A)-2 was synthesized as an example of the resin (A) serving as one raw material for the polyamide fine particles. Specifically, in an oil bath at 50° C., 2-pyrrolidone (127.7 g (1,500 mmol)) from which water was removed by purification and potassium t-butoxide (3.37 g (30 mmol)) were placed into a 500-mL flask and the resultant mixture was uniformly dissolved. 1-acetyl-2-caprolactam (3.46 g (30 mmol)) was added as an initiator and the system was replaced with nitrogen. Thereafter, polymerization was performed for 24 hours to give a mass product. The obtained mass product was crushed, thereafter washed with ethanol, and dried at 80° C. under vacuum for 24 hours to give the resin (A)-2 as a 2-pyrrolidone polymer having a melting point of 264° C., a crystallization temperature of 232° C., and a melt viscosity of 0.10 Pa·s.

Reference Example 3

In Reference Example 3, a resin (A)-3 was synthesized as an example of the resin (A) serving as one raw material for the polyamide fine particles. Specifically, in an oil bath at 50° C., 2-pyrrolidone (127.7 g (1,500 mmol)) from which water was removed by purification and potassium t-butoxide (3.37 g (30 mmol)) were placed into a 500-mL flask and the resultant mixture was uniformly dissolved. 1-acetyl-2-caprolactam (2.30 g (20 mmol)) was added as an initiator and the system was replaced with nitrogen. Thereafter, polymerization was performed for 72 hours to give a mass product. The obtained mass product was crushed, thereafter washed with ethanol, and dried at 80° C. under vacuum for 24 hours to give the resin (A)-3 as a 2-pyrrolidone polymer having a melting point of 265° C., a crystallization temperature of 233° C., and a melt viscosity of 0.20 Pa·s.

Reference Example 4

In Reference Example 4, a resin (A)-4 was synthesized as an example of the resin (A) serving as one raw material for the polyamide fine particles. Specifically, in an oil bath at 50° C., 2-pyrrolidone (102.1 g (1,200 mmol)) from which water was removed by purification, epsilon-caprolactone (34.2 g (300 mmol)), and potassium t butoxide (3.37 g (30 mmol)) were placed into a 500-mL flask and the resultant mixture was uniformly dissolved. 1-acetyl-2-caprolactam (3.46 g (30 mmol)) was added as an initiator and the inside of the system was replaced with nitrogen. Thereafter, polymerization was performed for 4 hours to give a mass product. The obtained mass product was crushed, thereafter washed with ethanol, and dried at 80° C. under vacuum for 24 hours to give the resin (A)-4 as a 2-pyrrolidone/caprolactone copolymer having a melting point of 193° C., a crystallization temperature of 170° C., and a melt viscosity of 0.03 Pa·s.

Reference Example 5

In Reference Example 5, a resin (A)-5 was synthesized as an example of the resin (A) serving as one raw material for the polyamide fine particles. Specifically, in an oil bath at 50° C., 2-azetidinone (85.3 g (1,500 mmol)) from which water was removed by purification, epsilon-caprolactone (34.2 g (300 mmol)), and potassium t butoxide (3.37 g (30 mmol)) were placed into a 500-mL flask and the resultant mixture was uniformly dissolved. 1-acetyl-2-caprolactam (3.46 g (30 mmol)) was added as an initiator and the system was replaced with nitrogen. Thereafter, polymerization was performed for 10 hours to give a mass product. The obtained mass product was crushed, thereafter washed with ethanol, and dried at 80° C. under vacuum for 24 hours to give the resin (A)-5 as a 2-azetidinone/caprolactone copolymer having a melting point of 272° C., a crystallization temperature of 240° C., and a melt viscosity of 0.06 Pa·s.

Other Used Materials

Other materials are as follows.

Monomers

2-Pyrrolidone (manufactured by FUJIFILM Wako Pure Chemical Corporation), molecular weight 85.1

Epsilon-Caprolactone (manufactured by FUJIFILM Wako Pure Chemical Corporation), molecular weight 114.1

2-Azetidinone (manufactured by FUJIFILM Wako Pure Chemical Corporation), molecular weight 71.1

4-Aminobutyric acid (special grade, manufactured by FUJIFILM Wako Pure Chemical Corporation), 103.1

Catalyst

Potassium t-butoxide (manufactured by Tokyo Chemical Industry Co., Ltd.), molecular weight 112.2

Initiators

1-Acetyl-2-caprolactam (manufactured by Tokyo Chemical Industry Co., Ltd.), molecular weight 115.2

1-Acetyl-2-pyrrolidone (manufactured by Tokyo Chemical Industry Co., Ltd.), molecular weight 127.1

1,3,5-Benzenetricarbonyl trichloride (manufactured by Tokyo Chemical Industry Co., Ltd.), molecular weight 265.5

Palmitoyl chloride (manufactured by manufactured by Tokyo Chemical Industry Co., Ltd.), molecular weight 274.9

Additives

Irganox 1098 (registered trademark) (Manufactured by BASF SE)

Lithium chloride (manufactured by Kanto Chemical Co., Inc.), molecular weight 42.4

TAICROS (manufactured by EVONIK JAPAN CO., LTD.)

A resin (B)-1 and a resin (B)-2 described below were used as the resin (B) serving as one raw material for the polyamide fine particles.

Resin (B)-1

The resin (B)-1 is polyethylene glycol manufactured by FUJIFILM Wako Pure Chemical Corporation. This resin (B)-1 was used by mixing a first molecular weight product having a weight average molecular weight of 6,000 (melt viscosity 0.15 Pa·s), a second molecular weight product having a weight average molecular weight of 20,000 (melt viscosity 0.78 Pa·s), and a third molecular weight product having a weight average molecular weight of 35,000 (melt viscosity 6.57 Pa·s) to have the desired melt viscosity.

Resin (B)-2

The resin (B)-2 is polyvinyl alcohol manufactured by The Nippon Synthetic Chemical Industry Co., Ltd. This resin (B)-2 has a melting point of 190° C., a degree of saponification of 99.1%, and a melt viscosity of 0.52 Pa·s.

Example 1

In Example 1, polyamide fine particles were prepared using the resin (A)-1 in Reference Example 1 as the resin (A) and the resin (B)-1 as the resin (B). The resin (B)-1 is polyethylene glycol having a melt viscosity of 0.87 Pa·s. The melt viscosity ratio of these resin (A)-1 and resin (B)-1 at 270° C. is 21.7.

Figure 2:
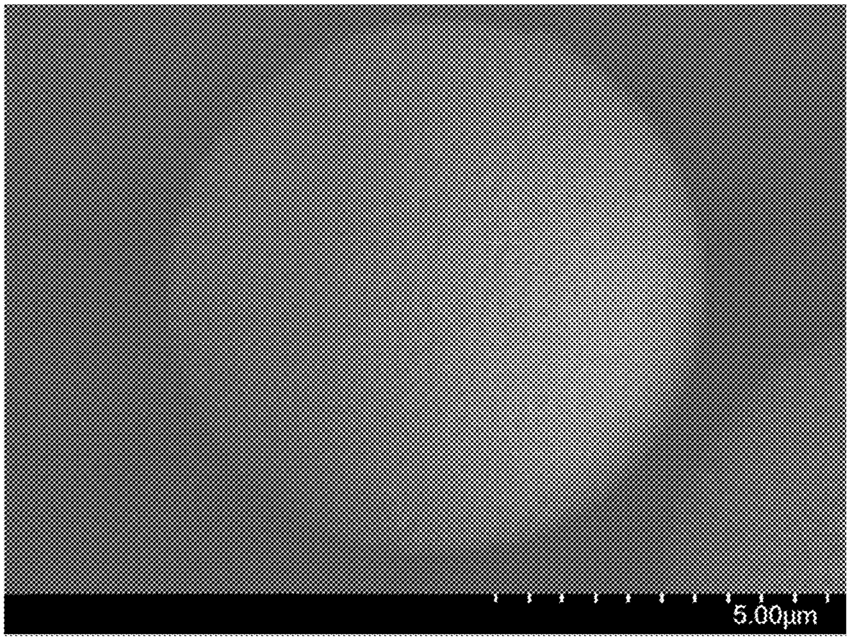
FIG. 2 is a photograph of the polyamide fine particles in Example 1 observed using a scanning electron microscope at a magnification of 10,000 times.

In detail, the resin (A)-1 (36 g) and the resin (B)-1 (36 g) were placed into a pressure-resistant vessel made of SUS316 including a 100-mL reaction vessel (hereinafter may be referred to as an autoclave). After the inside of the system was replaced with nitrogen, the temperature of these resin (A)-1 and resin (B)-1 was raised to 270° C. under nitrogen flow to form a polymer in polymer emulsion while the resultant mixture was melt-mixed for 30 minutes with stirring at 500 rpm using a stirring blade. After melt mixing the resin (A)-1 and the resin (B)-1, the molten mixture of the resin (A)-1 and the resin (B)-1 was cooled to room temperature in the vessel while nitrogen flow was continued. At this time, a time of retaining the temperature $t_{mixture}$ of the molten mixture in a temperature range of more than the crystallization temperature of the resin (A)-1 and lower than the melting point of the resin (A)-1 was 1 minute. Water (800 g) was added to the obtained molten mixture and the temperature of the resultant mixture was heated to 80° C. and stirred for 1 hour. The obtained slurry liquid was filtered, and water (800 g) was added to the filtered residue. The resultant mixture was heated to 80° C. and stirred and washed for 1 hour. Thereafter, the slurry liquid from which a coagulated product was removed by passing through a sieve having a mesh size of 200 μm was filtered again. The isolated filtered residue was dried at 80° C. for 12 hours to give a powder (25.4 g). At this time, there was no coagulated product exceeding 200 μm. The results of scanning electron micrographs of the obtained powder are illustrated in FIGS. 1 and 2. In Example 1, the polyamide fine particles were confirmed to be obtained as illustrated in FIGS. 1 and 2.

The marine biodegradability of the polyamide fine particles in Example 1 was evaluated. We found that 30% of the polyamide fine particles were degraded after one month from the start of the test. Therefore, the polyamide fine particles in Example 1 had the marine biodegradability. Other properties and effects (evaluation results) of the polyamide fine particles in Example 1 are listed in Table 1.

Example 2

In Example 2, polyamide fine particles were prepared and evaluated in the same manner as the manner in Example 1 except that the mixing mass ratio of the resin (A)-1 and the resin (B)-1 was changed to 25:75 when the melt mixing was performed. The properties and effects of the polyamide fine particles in Example 2 are listed in Table 1.

Example 3

In Example 3, the polyamide fine particles were prepared and evaluated in the same manner as the manner in Example 1 except that the mixing mass ratio of the resin (A)-1 and the resin (B)-1 was changed to 65:35 when the melt mixing was performed. The properties and effects of the polyamide fine particles in Example 3 are listed in Table 1.

Example 4

In Example 4, polyamide fine particles were prepared and evaluated in the same manner as the manner in Example 1 except that the mixing mass ratio of the resin (A)-1 and the resin (B)-1 was changed to 75:25 when the melt mixing was performed. The properties and effects of the polyamide fine particles in Example 4 are listed in Table 1.

Example 5

In Example 5, polyamide fine particles were prepared and evaluated in the same manner as the manner in Example 1 except that the used resin (B)-1 was changed to polyethylene glycol (melt viscosity 4.80 Pa·s and melt viscosity ratio to the resin (A)-1 120) having a different melt viscosity from that in Example 1. The properties and effects of the polyamide fine particles in Example 5 are listed in Table 1.

Example 6

In Example 6, polyamide fine particles were prepared and evaluated in the same manner as the manner in Example 1 except that the used resin (B)-1 was changed to polyethylene glycol (melt viscosity 3.00 Pa·s and melt viscosity ratio to the resin (A)-1 75.0) having a different melt viscosity from that in Example 1. The properties and effects of the polyamide fine particles in Example 6 are listed in Table 1.

Example 7

In Example 7, polyamide fine particles were prepared and evaluated in the same manner as the manner in Example 1 except that the resin (B)-1 to be used was changed to polyethylene glycol (melt viscosity 2.00 Pa·s and melt viscosity ratio to resin (A)-1 50.0) having a different melt viscosity from Example 1. The properties and effects of the polyamide fine particles in Example 7 are listed in Table 1.

Example 8

In Example 8, polyamide fine particles were prepared and evaluated in the same manner as the manner in Example 1 except that the used resin (B)-1 was changed to polyethylene glycol (melt viscosity 0.40 Pa·s and melt viscosity ratio to resin (A)-1 10.0) having a different melt viscosity from that in Example 1. The properties and effects of the polyamide fine particles in Example 8 are listed in Table 1.

Example 9

In Example 9, polyamide fine particles were prepared and evaluated in the same manner as the manner in Example 1 except that the used resin (B)-1 was changed to polyethylene glycol (melt viscosity 0.33 Pa·s and melt viscosity ratio to resin (A)-1 8.3) having a different melt viscosity from that in Example 1. The properties and effects of the polyamide fine particles of Example 9 are listed in Table 2.

Example 10

In Example 10, polyamide fine particles were prepared and evaluated in the same manner as the manner in Example 1 except that the resin used as the resin (A) was changed to the resin (A)-2 in Reference Example 2. The properties and effects of the polyamide fine particles in Example 10 are listed in Table 2.

Example 11

In Example 11, the polyamide fine particles were prepared and evaluated in the same manner as the manner in Example 1 except that the resin to be used as the resin (A) was changed to the resin (A)-3 in Reference Example 3. The properties and effects of the polyamide fine particles in Example 11 are listed in Table 2.

Example 12

In Example 12, polyamide fine particles were prepared and evaluated in the same manner as the manner in Example 1 except that the resin used as the resin (A) was changed to the resin (A)-4 in Reference Example 4 and the temperature at the time of melt mixing the resin (A)-4 and the resin (B)-1 was changed to 200° C. In the evaluation of the marine biodegradability of the polyamide fine particles in Example 12, 35% of the polyamide fine particles were degraded after one month from the start of the test. Therefore, the polyamide fine particles in Example 12 had the marine biodegradability. Other properties and effects of the polyamide fine particles in Example 12 are listed in Table 2.

Example 13

In Example 13, polyamide fine particles were prepared and evaluated in the same manner as the manner in Example 1 except that the washing in Example 1 (stirring and washing the filtered residue with water as described above) was not performed, the slurry liquid obtained after the melt mixing was filtered, and the isolated filtered residue was dried at 80° C. for 12 hours. The properties and effects of the polyamide fine particles in Example 13 are listed in Table 2.

Example 14

In Example 14, polyamide fine particles were prepared and evaluated in the same manner as the manner in Example 1 except that at the time of melt mixing, 0.36 g of Irganox 1098 was added as an additive to perform melt mixing. In the evaluation of the marine biodegradability of the polyamide fine particles in Example 14, 28% of the polyamide fine particles were degraded after one month from the start of the test. Therefore, the polyamide fine particles in Example 14 had the marine biodegradability. Other properties and effects of the polyamide fine particles in Example 14 are listed in Table 2.

Example 15

In Example 15, polyamide fine particles were prepared and evaluated in the same manner as the manner in Example 1 except that at the time of melt mixing, 0.36 g of lithium chloride was added as an additive to perform melt mixing. In the evaluation of the marine biodegradability of the polyamide fine particles in Example 15, 30% of the polyamide fine particles were degraded after one month from the start of the test. Therefore, the polyamide fine particles in Example 15 had the marine biodegradability. Other properties and effects of the polyamide fine particles in Example 15 are listed in Table 2.

Example 16

In Example 16, polyamide fine particles were prepared and evaluated in the same manner as the manner in Example 1 except that at the time of melt mixing, 0.29 g of TAICROS was added as an additive to perform melt mixing. In the evaluation of the marine biodegradability of the polyamide fine particles in Example 16, 20% of the polyamide fine particles were degraded after one month from the start of the test. Therefore, the polyamide fine particles in Example 16 had the marine biodegradability. Other properties and effects of the polyamide fine particles in Example 16 are listed in Table 2.

Example 17

In Example 17, polyamide fine particles were prepared and evaluated in the same manner as the manner in Example 1 except that the resin used as the resin (A) was changed to the resin (A)-5 in Reference Example 5 and the temperature at the time of melt mixing of the resin (A)-5 and the resin (B)-1 was changed to 280° C. The properties and effects of the polyamide fine particles in Example 17 are listed in Table 2.

Example 18

In Example 18, polyamide fine particles were prepared and evaluated in the same manner as the manner in Example 1 except that the amount of water used as the washing solution was changed from a total of 1,600 g to a total of 400 g. The properties and effects of the polyamide fine particles in Example 18 are listed in Table 2.

Example 19

In Example 19, polyamide fine particles were prepared and evaluated in the same manner as the manner in Example 1 except that the amount of water used as the washing solution was changed from a total of 1,600 g to a total of 800 g. The properties and effects of the polyamide fine particles in Example 19 are listed in Table 2.

Example 20

In Example 20, polyamide fine particles were prepared and evaluated in the same manner as the manner in Example 1 except that the amount of water used as the washing solution was changed from a total of 1,600 g to a total of 1,200 g. The properties and effects of the polyamide fine particles in Example 20 are listed in Table 2.

Example 21

In Example 21, polyamide fine particles were prepared using the resin (A)-1 in Reference Example 1 as the resin (A) and the resin (B)-1 as the resin (B). The resin (B)-1 is polyethylene glycol having a melt viscosity of 0.87 Pa·s. The melt viscosity ratio of these resin (A)-1 and resin (B)-1 at 270° C. is 21.7.

Figure 3:
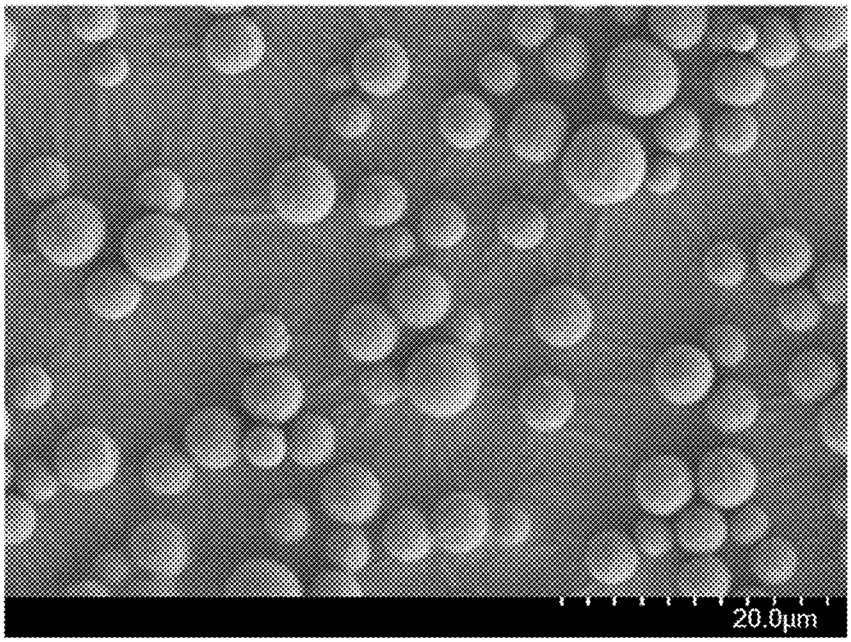
FIG. 3 is a photograph of the polyamide fine particles in Example 21 observed using a scanning electron microscope at a magnification of 2,000 times.
Figure 4:
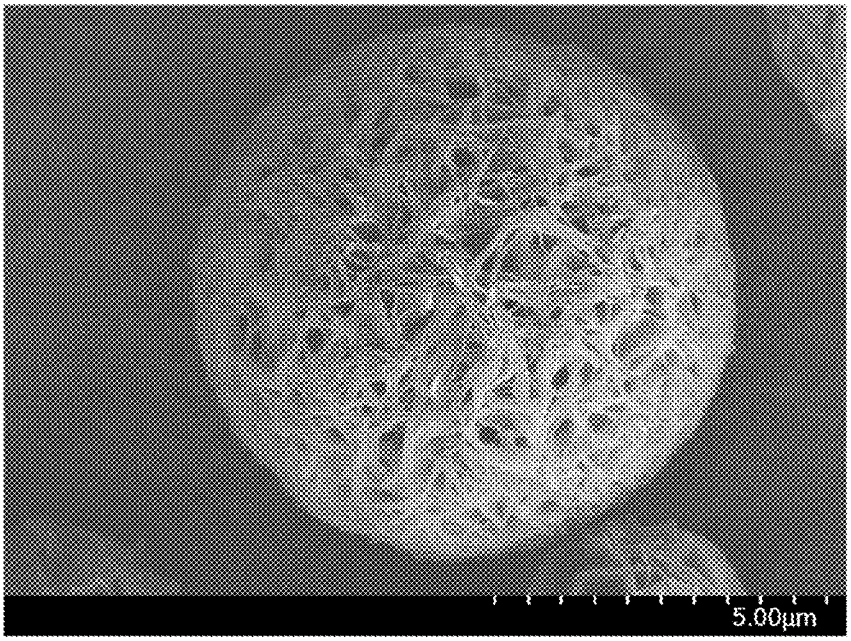
FIG. 4 is a photograph of the polyamide fine particles in Example 21 observed using a scanning electron microscope at a magnification of 10,000 times.

In detail, the resin (A)-1 (36 g) and the resin (B)-1 (36 g) were placed into an autoclave made of SUS316 including a 100-mL reaction vessel. After the inside of the system was replaced with nitrogen, the temperature of these resin (A)-1 and resin (B)-1 was raised to 270° C. under nitrogen flow to form a polymer in polymer emulsion while the resultant mixture was melt-mixed at 500 rpm for 30 minutes using a stirring blade. After melt mixing the resin (A)-1 and the resin (B)-1, the temperature $t_{mixture}$ of the molten mixture of the resin (A)-1 and the resin (B)-1 was maintained at 237° C., which is the melting point of resin (A)-1+5° C., while nitrogen flow was continued. At this time, a time maintaining the temperature $t_{mixture}$ in the temperature range of more than the crystallization temperature of the resin (A)-1 and less than the melting point of the resin (A)-1 was 60 minutes. Thereafter, the molten mixture was ejected into a container containing water (800 g), cooled to room temperature, thereafter re-heated to 80° C., and stirred for 1 hour. The obtained slurry liquid was filtered, and water (800 g) was added to the filtered residue. The resultant mixture was heated to 80° C. and stirred and washed for 1 hour. Thereafter, the slurry liquid from which a coagulated product was removed by passing through a sieve having a mesh size of 200 μm was filtered again. The isolated filtered residue was dried at 80° C. for 12 hours to give a powder (25.4 g). At this time, there was no coagulated product exceeding 200 μm. The results of scanning electron micrographs of the obtained powder are illustrated in FIGS. 3 and 4. In Example 21, the polyamide fine particles were confirmed to be obtained as illustrated in FIGS. 3 and 4.

The polyamide fine particles in Example 21 obtained as described above were evaluated for the marine biodegradability and other properties. The properties and effects of the polyamide fine particles of Example 21 are listed in Table 3.

Example 22

In Example 22, polyamide fine particles were prepared and evaluated in the same manner as the manner in Example 21 except that the resin used as resin (A) was changed to the resin (A)-3 in Reference Example 3 and the mixing mass ratio of the resin (A)-3 and the resin (B)-1 at the time of melt mixing was changed to 70:30. The properties and effects of the polyamide fine particles in Example 22 are listed in Table 3.

Example 23

In Example 23, polyamide fine particles were prepared and evaluated in the same manner as the manner in Example 21 except that the used resin (B)-1 was changed to polyethylene glycol (melt viscosity 3.00 Pa·s and melt viscosity ratio to the resin (A)-1 75.0) having a different melt viscosity from that in Example 21, the mixing mass ratio of the resin (A)-1 and the resin (B)-1 at the time of melt mixing was changed to 30:70, the temperature at the time of the melt mixing of the resin (A)-1 and the resin (B)-1 was changed to 280° C., and the time of maintaining the temperature $t_{mixture}$ of the molten mixture of the resin (A)-1 and the resin (B)-1 in the temperature range of more than the crystallization temperature of the resin (A)-1 and less than the melting point of the resin (A)-1 was changed to 90 minutes. The properties and effects of the polyamide fine particles in Example 23 are listed in Table 3.

Example 24

In Example 24, polyamide fine particles were prepared and evaluated in the same manner as the manner in Example 22 except that the time of maintaining the temperature $t_{mixture}$ of the molten mixture in the temperature range of more than the crystallization temperature of the resin (A)-3 and less than the melting point of the resin (A)-3 was changed to 90 minutes. The properties and effects of the polyamide fine particles in Example 24 are listed in Table 3.

Example 25

In Example 25, polyamide fine particles were prepared and evaluated in the same manner as the manner in Example 21 except that the resin used as the resin (A) was changed to the resin (A)-2 in Reference Example 2, and the mixing mass ratio of the resin (A)-2 and the resin (B)-1 at the time of melt mixing was changed to 65:35. The properties and effects of the polyamide fine particles in Example 25 are listed in Table 3.

Example 26

In Example 26, polyamide fine particles were prepared and evaluated in the same manner as the manner in Example 21 except that the time of maintaining the temperature $t_{mixture}$ of the molten mixture in the temperature range of more than the crystallization temperature of the resin (A)-1 and less than the melting point of the resin (A)-1 was changed to 150 minutes. The properties and effects of the polyamide fine particles in Example 26 are listed in Table 3.

Example 27

In Example 27, polyamide fine particles were prepared and evaluated in the same manner as the manner in Example 22 except that the time of maintaining the temperature $t_{mixture}$ of the molten mixture in the temperature range of more than the crystallization temperature of the resin (A)-3 and less than the melting point of the resin (A)-3 was changed to 30 minutes. The properties and effects of the polyamide fine particles in Example 27 are listed in Table 3.

Example 28

In Example 28, polyamide fine particles were prepared and evaluated in the same manner as the manner in Example 21 except that the time of maintaining the temperature $t_{mixture}$ of the molten mixture in the temperature range of more than the crystallization temperature of the resin (A)-1 and less than the melting point of the resin (A)-1 was changed to 30 minutes. The properties and effects of the polyamide fine particles in Example 28 are listed in Table 3.

Example 29

In Example 29, polyamide fine particles were prepared and evaluated in the same manner as the manner in Example 23 except that the time of maintaining the temperature $t_{mixture}$ of the molten mixture in the temperature range of more than the crystallization temperature of the resin (A)-1 and less than the melting point of the resin (A)-1 was changed to 30 minutes. The properties and effects of the polyamide fine particles in Example 29 are listed in Table 3.

Example 30

In Example 30, polyamide fine particles were prepared and evaluated in the same manner as the manner in Example 22 except that the time of maintaining the temperature $t_{mixture}$ of the molten mixture in the temperature range of more than the crystallization temperature of the resin (A)-3 and less than the melting point of the resin (A)-3 was changed to 180 minutes. The properties and effects of the polyamide fine particles in Example 30 are listed in Table 3.

Example 31

In Example 31, polyamide fine particles were prepared and evaluated in the same manner as the manner in Example 23 except that the time of maintaining the temperature $t_{mixture}$ of the molten mixture in the temperature range of more than the crystallization temperature of the resin (A)-1 and less than the melting point of the resin (A)-1 was changed to 45 minutes. The properties and effects of the polyamide fine particles in Example 31 are listed in Table 3.

Example 32

In Example 32, polyamide fine particles were prepared and evaluated in the same manner as the manner in Example 22 except that the time of maintaining the temperature $t_{mixture}$ of the molten mixture in the temperature range of more than the crystallization temperature of the resin (A)-3 and less than the melting point of the resin (A)-3 was changed to 300 minutes. The properties and effects of the polyamide fine particles in Example 32 are listed in Table 3.

Example 33

In Example 33, polyamide fine particles were prepared and evaluated in the same manner as the manner in Example 22 except that the mixing mass ratio of the resin (A)-3 and the resin (B)-1 at the time of melt mixing was changed to 75:25 and the time of maintaining the temperature $t_{mixture}$ of the molten mixture in the temperature range of more than the crystallization temperature of the resin (A)-3 and less than the melting point of the resin (A)-3 was changed to 55 minutes. The properties and effects of the polyamide fine particles of Example 33 are listed in Table 4.

Example 34

In Example 34, polyamide fine particles were prepared and evaluated in the same manner as the manner in Example 21 except that the used resin (B)-1 was changed to polyethylene glycol (melt viscosity 4.80 Pa·s and melt viscosity ratio to the resin (A)-1 120) having a different melt viscosity from that in Example 21, the mixing mass ratio of the resin (A)-1 and the resin (B)-1 at the time of melt mixing was changed to 30:70, the temperature at the time of the melt mixing of the resin (A)-1 and the resin (B)-1 was changed to 280° C., and the time of maintaining the temperature $t_{mixture}$ of the molten mixture in the temperature range of more than the crystallization temperature of the resin (A)-1 and less than the melting point of the resin (A)-1 was changed to 110 minutes. The properties and effects of the polyamide fine particles in Example 34 are listed in Table 4.

Example 35

In Example 35, polyamide fine particles were prepared and evaluated in the same manner as the manner in Example 21 except that the used resin (B)-1 was changed to polyethylene glycol (melt viscosity 3.00 Pa·s and melt viscosity ratio to the resin (A)-1 75.0) having a different melt viscosity from that in Example 21. The properties and effects of the polyamide fine particles in Example 35 are listed in Table 4.

Example 36

In Example 36, polyamide fine particles were prepared and evaluated in the same manner as the manner in Example 21 except that the used resin (B)-1 was changed to polyethylene glycol (melt viscosity 0.40 Pa·s and melt viscosity ratio to the resin (A)-1 10.0) having a different melt viscosity from that in Example 21. The properties and effects of the polyamide fine particles in Example 36 are listed in Table 4.

Example 37

In Example 37, polyamide fine particles were prepared and evaluated in the same manner as the manner in Example 21 except that the resin used as the resin (A) was changed to the resin (A)-2 in Reference Example 2. The properties and effects of the polyamide fine particles in Example 37 are listed in Table 4.

Example 38

In Example 38, polyamide fine particles were prepared and evaluated in the same manner as the manner in Example 21 except that the mixing mass ratio of the resin (A)-1 and the resin (B)-1 at the time of melt mixing was changed to 70:30. The properties and effects of the polyamide fine particles in Example 38 are listed in Table 4.

Example 39

In Example 39, polyamide fine particles were prepared and evaluated in the same manner as the manner in Example 21 except that the mixing mass ratio of the resin (A)-1 and the resin (B)-1 at the time of melt mixing was changed to 30:70. The properties and effects of the polyamide fine particles in Example 39 are listed in Table 4.

Example 40

In Example 40, polyamide fine particles were prepared and evaluated in the same manner as the manner in Example 21 except that the temperature at the time of melt mixing of the resin (A)-1 and the resin (B)-1 was changed to 264° C. The properties and effects of the polyamide fine particles in Example 40 are listed in Table 4.

Example 41

In Example 41, polyamide fine particles were prepared and evaluated in the same manner as the manner in Example 21 except that the amount of water used as the washing solution was changed from a total of 1,600 g to a total of 400 g. The properties and effects of the polyamide fine particles in Example 41 are listed in Table 4.

Example 42

In Example 42, polyamide fine particles were prepared and evaluated in the same manner as the manner in Example 21 except that the amount of water used as the washing solution was changed from a total of 1,600 g to a total of 1,200 g. The properties and effects of the polyamide fine particles in Example 42 are listed in Table 4.

Comparative Example 1

In Comparative Example 1, polyamide fine particles were prepared using the resin (B)-1, which was a polyethylene glycol having a weight average molecular weight of 20,000, as the resin (B) and a different resin from the resin (A). In detail, 4-aminobutyric acid (4 g), the resin (B)-1 (6 g), and water (10 g) serving as a solvent were placed into a 100-mL autoclave. The autoclave was sealed and thereafter purged with nitrogen to 10 kg/cm$^2$. After adjusting the pressure in the system to 0.1 kg/cm$^2$ while nitrogen was being released, the temperature was raised to 240° C. At this time, after the pressure in the system reached 10 kg/cm$^2$, the pressure was controlled by slightly depressurizing the water vapor to maintain 10 kg/cm$^2$. After the temperature reached 240° C., the pressure was released at a rate of 0.2 kg/cm$^2$·min to initiate polymerization. At this point of time, the internal solution was uniform and clear. The pressure in the system was lowered to 0 kg/cm$^2$ while the temperature was raised to 255° C. At the same time when the pressure in the system reached 0 kg/cm$^2$, heating was maintained while nitrogen was being flowed for 1 hour to complete the polymerization. The inner solution was suspended after the polymerization. After filling with nitrogen to 10 kg/cm$^2$, the resultant inner solution was cooled to room temperature. Water was added to the obtained solid product and the resultant mixture was heated to 80° C. to dissolve soluble components. The obtained slurry liquid was filtered. Water (40 g) was added to the filtered residue and the filtered residue was washed at 80° C. Thereafter, the slurry liquid passed through a sieve having a mesh size of 200 μm to remove a coagulated product was filtered again. The isolated filtered residue was dried at 80° C. for 12 hours to give polyamide fine particles.

For the polyamide fine particles in Comparative Example 1 obtained as described above, the same evaluations as the evaluations in Example 1 were performed. The properties and effects of the polyamide fine particles in Comparative Example 1 are listed in Table 5.

Comparative Example 2

In Comparative Example 2, pure water and the resin (A)-1 in Reference Example 1 were placed into a 1-L autoclave so that the concentration of the resin (A)-1 to pure water was 1% by weight. This autoclave was heated so that the internal temperature reached 150° C. to dissolve the resin (A)-1 in hot water. After completion of the heating, the temperature of the hot water was maintained for 30 minutes, and thereafter the hot water was cooled until the temperature reached room temperature to give a suspension solution of the fine particles of the resin (A)-1 dispersed in pure water. The suspension solution was further filtered through a filter paper and a remaining product on the filter paper was dried at 80° C. for 8 hours under vacuum. Consequently, the polyamide fine particles in Comparative Example 2 were obtained. For the polyamide fine particles in Comparative Example 2 obtained as described above, the same evaluations as the evaluations in Example 1 were performed. The properties and effects of the polyamide fine particles in Comparative Example 2 are listed in Table 5.

Comparative Example 3

In Comparative Example 3, 2-pyrrolidone (21.3 g (0.25 mol)) from which water was removed by purification and potassium t-butoxide (0.346 g (3 mmol)) were placed into a flask equipped with a pressure reducer and the resultant mixture was heated at 50° C. under reduced pressure to react potassium t-butoxide (hereinafter referred to as a "catalyst"). As a result, the mixture of 2-pyrrolidone and the potassium salt of 2-pyrrolidone serving as a basic polymerization catalyst was obtained.

The reaction vessel of the autoclave including the addition pot of the raw materials and the 100-mL reaction vessel was filled with the obtained mixture (5.98 g) and the addition pot was filled with 1-acetyl-2-pyrrolidone (0.18 g). Subsequently, the reaction vessel was filled with carbon dioxide until the internal pressure reaches 6 MPa, the internal temperature was set to 40° C. to melt the mixture, and thereafter 1-acetyl-2-pyrrolidone was supplied from the addition pot. Thereafter, the pressure was further increased to 30 MPa and the polymerization reaction of 2-pyrrolidone was performed in the reaction vessel for 120 minutes. After completion of the reaction, pressure was released, carbon dioxide was refilled (to 30 MPa), and pressure was released again. Thereafter, the fine particles were taken out, rinsed with water, and dried to give the polyamide fine particles in Comparative Example 3. For the polyamide fine particles in Comparative Example 3 obtained as described above, the same evaluations as the evaluations in Example 1 were performed. The properties and effects of the polyamide fine particles in Comparative Example 3 are listed in Table 5.

Comparative Example 4

In Comparative Example 4, 2-pyrrolidone 4 (2.55 g (500 mmol)), a 2-pyrrolidone solution containing 24.3% of sodium salt of 2-pyrrolidone (7.93 g (18 mmol as the sodium salt of 2-pyrrolidone)), and dehydrated hexane (50 g) were placed into a 500-mL flask, and while the resultant mixture was being stirred, 1,3,5-benzenetricarbonyl trichloride (0.27 g (1.0 mmol)) and palmitoyl chloride (1.64 g (6.0 mmol)) were added. The resultant mixture was stirred at 50° C. for 8 hours and allowed to stand at room temperature overnight. The reaction solution was filtered. The filtered residue was washed with methanol and tetrahydrofuran, air-dried under a stream of nitrogen, and dried at 60° C. under reduced pressure to give the polyamide fine particles in Comparative Example 4. For the polyamide fine particles in Comparative Example 4 obtained as described above, the same evaluations as the evaluations in Example 1 were performed. The properties and effects of the polyamide fine particles in Comparative Example 4 are listed in Table 5.

Comparative Example 5

In Comparative Example 5, polyamide fine particles were prepared in the same manner as the manner in Example 1 except that the resin (B)-1 in Example 1 was changed to polypropylene glycol (melt viscosity 5.50 Pa·s, melt viscosity ratio to polyamide 4 (PA4) 137.5) having a different melt viscosity from that of the resin (B)-1 in Example 1. In Comparative Example 5, however, polyamide fine particles could not be obtained because an emulsion diameter was excessively fine and a polymer in polymer emulsion could not be stably maintained.

Comparative Example 6

In Comparative Example 6, polyamide fine particles were prepared in the same manner as the manner in Example 1 except that the resin (B)-1 in Example 1 was changed to polypropylene glycol (melt viscosity 0.15 Pa·s, melt viscosity ratio to PA4 3.8) having a different melt viscosity from that of the resin (B)-1 in Example 1. In Comparative Example 6, however, polyamide fine particles could not be obtained because the resin (A)-1 and the polypropylene glycol could not maintain a balance and could not form a polymer in polymer emulsion.

Comparative Example 7

In Comparative Example 7, polyamide fine particles were prepared in the same manner as the manner in Example 1 except that the mixing mass ratio of the resin (A)-1 and the resin (B)-1 at the time of melt mixing was changed to 90:10. In Comparative Example 7, however, polyamide fine particles could not be obtained because the resin (A)-1 and the resin (B)-1 could not maintain a balance and could not form a polymer in polymer emulsion.

Comparative Example 8

In Comparative Example 8, polyamide fine particles were prepared in the same manner as the manner in Example 1 except that the mixing mass ratio of the resin (A)-1 and the resin (B)-1 at the time of melt mixing was changed to 10:90. In Comparative Example 8, however, phase inversion occurred and no polyamide fine particles were obtained.

Comparative Example 9

In Comparative Example 9, polyamide fine particles were prepared in the same manner as the manner in Example 1 except that the resin used as the resin (B) was changed to the resin (B)-2 (melt viscosity 0.52 Pa·s, melt viscosity ratio to the resin (A)-1 13.0), which was polyvinyl alcohol described above. The interfacial tension and melt viscosity of the resin (A)-1 and the resin (B)-2, however, were not balanced and polyamide fine particles were not obtained.

Comparative Example 10

In Comparative Example 10, polyamide fine particles were prepared in the same manner as the manner in Example 21 except that the resin used as the resin (B) was changed to the resin (B)-2 (melt viscosity 0.52 Pa·s, melt viscosity ratio to the resin (A)-1 13.0), which was polyvinyl alcohol described above. The interfacial tension and melt viscosity of the resin (A)-1 and the resin (B)-2, however, were not balanced and polyamide fine particles were not obtained.

Comparative Example 11

In Comparative Example 11, polyamide fine particles were prepared in the same manner as the manner in Example 21 except that the resin (A)-1 and the resin (B)-1 were charged in an autoclave heated to 200° C. The interfacial tension and melt viscosity of the resin (A)-1 and the resin (B)-1, however, were not balanced and polyamide fine particles were not obtained.

Comparative Example 12

In Comparative Example 12, polyamide fine particles were prepared and evaluated in the same manner as the manner in Example 22 except that the time of maintaining the temperature $t_{mixture}$ of the molten mixture in the temperature range of more than the crystallization temperature of the resin (A)-3 and less than the melting point of the resin (A)-3 was changed to 20 minutes. The properties and effects of the polyamide fine particles in Comparative Example 12 are listed in Table 5.

Comparative Example 13

In Comparative Example 13, polyamide fine particles were prepared and evaluated in the same manner as the manner in Example 21 except that the time of maintaining the temperature $t_{mixture}$ of the molten mixture in the temperature range of more than the crystallization temperature of the resin (A)-1 and less than the melting point of the resin (A)-1 was changed to 20 minutes. The properties and effects of the polyamide fine particles in Comparative Example 13 are listed in Table 5.

Comparative Example 14

In Comparative Example 14, polyamide fine particles were prepared and evaluated in the same manner as the manner in Example 23 except that the time of maintaining the temperature $t_{mixture}$ of the molten mixture in the temperature range of more than the crystallization temperature of the resin (A)-1 and less than the melting point of the resin (A)-1 was changed to 20 minutes. The properties and effects of the polyamide fine particles in Comparative Example 14 are listed in Table 5.

Comparative Example 15

In Comparative Example 15, polyamide fine particles were prepared and evaluated in the same manner as the manner in Example 21 except that the temperature at the time of melt mixing of the resin (A)-1 and the resin (B)-1 was changed to 290° C. The properties and effects of the polyamide fine particles in Comparative Example 15 are listed in Table 5.

TABLE 1

| | | Unit | Example 1 | Example 2 | Example 3 | Example 4 | Example 5 | Example 6 |
|---|---|---|---|---|---|---|---|---|
| Particle properties | Sphericity | — | 97 | 96 | 98 | 100 | 97 | 97 |
| | Standard deviation of sphericity | — | 1.12 | 1.10 | 1.12 | 0.84 | 1.11 | 1.11 |
| | Volume average particle diameter | μm | 5.8 | 5.6 | 6.0 | 6.2 | 0.1 | 2.0 |
| | Particle size distribution index | — | 1.35 | 1.45 | 1.31 | 1.21 | 1.21 | 1.31 |
| | Amount of impurities contained | % by weight | Undetectable | Undetectable | Undetectable | Undetectable | Undetectable | Undetectable |

TABLE 1-continued

| | | Unit | Example 1 | Example 2 | Example 3 | Example 4 | Example 5 | Example 6 |
|---|---|---|---|---|---|---|---|---|
| | Stability index over time | — | 0.89 | 0.91 | 0.89 | 1.19 | 0.90 | 0.90 |
| | BET specific surface area $A_{BET}$ | $m^2/g$ | 3.1 | 3.5 | 2.9 | 2.8 | 4.8 | 3.9 |
| | Porosity r | % | 0.5 | 0.5 | 0.5 | 0.5 | 0.5 | 05 |
| | Ratio ($r/A_{BET}$) | — | 0.2 | 0.1 | 0.2 | 0.2 | 0.1 | 0.1 |
| | Melting point of fine particles | ° C. | 263 | 263 | 262 | 263 | 260 | 261 |
| | Crystallization temperature of fine particles | ° C. | 232 | 232 | 231 | 230 | 231 | 231 |
| | Weight average molecular weight of fine particles | — | 28,000 | 28,000 | 28,000 | 28,000 | 21,000 | 25,000 |
| Effects | Average deviation of coefficient of dynamical friction immediately after | — | 0.0025 | 0.0032 | 0.0023 | 0.0020 | 0.0030 | 0.0029 |
| | Average deviation of coefficient of dynamical friction after 5 minutes | — | 0.0025 | 0.0032 | 0.0023 | 0.0020 | 0.0035 | 0.0033 |
| | Marine biodegradability | % | 30 | — | — | — | — | — |
| | Dispersion stability in linseed oil | % | 38 | — | — | — | — | — |

| | | Unit | Example 7 | Example 8 |
|---|---|---|---|---|
| Particle proper-ties | Sphericity | — | 97 | 97 |
| | Standard deviation of sphericity | — | 1.12 | 1.50 |
| | Volume average particle diameter | μm | 3.8 | 14.4 |
| | Particle size distribution index | — | 1.35 | 1.45 |
| | Amount of impurities contained | % by weight | Undetec-table | Undetec-table |
| | Stability index over time | — | 0.89 | 0.67 |
| | BET specific surface area $A_{BET}$ | $m^2/g$ | 3.5 | 2.5 |
| | Porosity r | % | 0.5 | 0.5 |
| | Ratio ($r/A_{BET}$) | — | 0.1 | 0.2 |
| | Melting point of fine particles | ° C. | 262 | 262 |
| | Crystallization temperature of fine particles | ° C. | 231 | 231 |
| | Weight average molecular weight of fine particles | — | 26,000 | 29,000 |
| Effects | Average deviation of coefficient of dynamical friction immediately after | — | 0.0028 | 0.0031 |
| | Average deviation of coefficient of dynamical | — | 0.0028 | 0.0031 |

TABLE 1-continued

| | Unit | Example 1 | Example 2 | Example 3 | Example 4 | Example 5 | Example 6 |
|---|---|---|---|---|---|---|---|
| friction after 5 minutes | | | | | | | |
| Marine biodegradability | % | | | — | | — | |
| Dispersion stability in linseed oil | % | | | — | | — | |

TABLE 2

| | | Unit | Example 9 | Example 10 | Example 11 | Example 12 | Example 13 | Example 14 | Example 15 | Example 16 |
|---|---|---|---|---|---|---|---|---|---|---|
| Particle properties | Sphericity | — | 97 | 97 | 97 | 97 | 97 | 100 | 98 | 97 |
| | Standard deviation of sphericity | — | 1.55 | 1.12 | 1.12 | 1.17 | 1.12 | 0.56 | 1.19 | 1.11 |
| | Volume average particle diameter | μm | 15.5 | 6.5 | 6.9 | 5.0 | 5.8 | 6.3 | 6.2 | 6.2 |
| | Particle size distribution index | — | 1.67 | 1.31 | 1.31 | 1.34 | 1.35 | 1.25 | 1.28 | 1.28 |
| | Amount of impurities contained | % by weight | Undetectable | Undetectable | Undetectable | Undetectable | 0.6 | Undetectable | Undetectable | Undetectable |
| | Stability index over time | — | 0.65 | 0.89 | 0.89 | 0.85 | 0.56 | 1.79 | 0.84 | 0.90 |
| | BET specific surface area $A_{BET}$ | $m^2/g$ | 2.5 | 3.1 | 2.9 | 4.0 | 3.1 | 0.9 | 1.5 | 1.5 |
| | Porosity r | % | 0.5 | 0.5 | 0.5 | 0.5 | 0.5 | 0.0 | 0.5 | 0.0 |
| | Ratio ($r/A_{BET}$) | — | 0.2 | 0.2 | 0.2 | 0.1 | 0.2 | 0.0 | 0.3 | 0.0 |
| | Melting point of fine particles | ° C. | 262 | 263 | 263 | 193 | 263 | 263 | 263 | 263 |
| | Crystallization temperature of fine particles | ° C. | 230 | 232 | 232 | 170 | 232 | 232 | 227 | 228 |
| | Weight average molecular weight of fine particles | — | 32,000 | 42,000 | 65,000 | 40,000 | 28,000 | 42,000 | 28,000 | 28,000 |
| Effects | Average deviation of coefficient of dynamical friction immediately after | — | 0.0034 | 0.0025 | 0.0025 | 0.0028 | 0.0025 | 0.0020 | 0.0023 | 0.0023 |
| | Average deviation of coefficient of dynamical friction after 5 minutes | — | 0.0034 | 0.0026 | 0.0026 | 0.0039 | 0.0057 | 0.0020 | 0.0023 | 0.0023 |
| | Marine biodegradability | % | — | — | — | 35 | — | 28 | 30 | 20 |
| | Dispersion stability in linseed oil | % | — | — | — | 38 | — | 40 | 38 | 40 |

| | | Unit | Example 17 | Example 18 | Example 19 | Example 20 |
|---|---|---|---|---|---|---|
| Particle properties | Sphericity | — | 96 | 97 | 97 | 97 |
| | Standard deviation of sphericity | — | 1.29 | 1.12 | 1.12 | 1.12 |
| | Volume average particle diameter | μm | 8.5 | 5.8 | 5.8 | 5.8 |
| | Particle size distribution index | — | 1.65 | 1.35 | 1.35 | 1.35 |

TABLE 2-continued

| | | Unit | Example 9 | Example 10 | Example 11 | Example 12 | Example 13 | Example 14 | Example 15 | Example 16 |
|---|---|---|---|---|---|---|---|---|---|---|
| | Amount of impurities contained | % by weight | | Undetectable | | 0.5 | | 0.3 | | 0.1 |
| | Stability index over time | — | | 0.78 | | 0.60 | | 0.69 | | 0.81 |
| | BET specific surface area $A_{BET}$ | $m^2/g$ | | 3.3 | | 4.3 | | 5.3 | | 6.3 |
| | Porosity r | % | | 2.0 | | 0.5 | | 0.5 | | 0.5 |
| | Ratio ($r/A_{BET}$) | — | | 0.6 | | 0.2 | | 0.2 | | 0.2 |
| | Melting point of fine particles | ° C. | | 271 | | 263 | | 263 | | 263 |
| | Crystallization temperature of fine particles | ° C. | | 238 | | 232 | | 232 | | 232 |
| | Weight average molecular weight of fine particles | — | | 23,000 | | 28,000 | | 28,000 | | 28,000 |
| Effects | Average deviation of coefficient of dynamical friction immediately after | — | | 0.0032 | | 0.0025 | | 0.0025 | | 0.0025 |
| | Average deviation of coefficient of dynamical friction after 5 minutes | — | | 0.0042 | | 0.00049 | | 0.0038 | | 0.0030 |
| | Marine biodegradability | % | | — | | — | | — | | — |
| | Dispersion stability in linseed oil | % | | — | | — | | — | | — |

TABLE 3

| | | Unit | Example 21 | Example 22 | Example 23 | Example 24 | Example 25 | Example 26 | Example 27 | Example 28 |
|---|---|---|---|---|---|---|---|---|---|---|
| Particle properties | Sphericity | — | 97 | 97 | 96 | 97 | 97 | 96 | 97 | 97 |
| | Standard deviation of sphericity | — | 1.12 | 1.14 | 1.40 | 1.10 | 1.13 | 1.38 | 1.14 | 1.12 |
| | Volume average particle diameter | μm | 5.8 | 6.9 | 5.5 | 6.9 | 6.5 | 5.8 | 6.9 | 5.8 |
| | Particle size distribution index | — | 1.35 | 1.31 | 1.28 | 1.31 | 1.33 | 1.35 | 1.31 | 1.35 |
| | Amount of impurities contained | % by weight | Undetectable | Undetectable | Undetectable | Undetectable | Undetectable | Undetectable | Undetectable | Undetectable |
| | Stability index over time | — | 0.89 | 0.88 | 0.71 | 0.91 | 0.88 | 0.72 | 0.88 | 0.89 |
| | BET specific surface area $A_{BET}$ | $m^2/g$ | 3.1 | 0.8 | 5 | 0.8 | 1.92 | 3.1 | 0.8 | 3.1 |
| | Porosity r | % | 49.6 | 12.8 | 80 | 20.6 | 49.6 | 80 | 4.8 | 18.6 |
| | Ratio ($r/A_{BET}$) | — | 16.0 | 16.0 | 16.0 | 25.8 | 25.8 | 25.8 | 6.0 | 6.0 |
| | Melting point of fine particles | ° C. | 263 | 263 | 263 | 263 | 263 | 263 | 263 | 263 |
| | Crystallization temperature of fine particles | ° C. | 232 | 232 | 232 | 232 | 232 | 232 | 232 | 232 |
| | Weight average molecular weight of fine particles | — | 27,000 | 64,000 | 23,000 | 63,000 | 27,000 | 24,000 | 65,000 | 28,000 |

TABLE 3-continued

| | | | | | | | | | | |
|---|---|---|---|---|---|---|---|---|---|---|
| Effects | Average deviation of coefficient of dynamical friction immediately after | — | 0.0025 | 0.0026 | 0.0030 | 0.0026 | 0.0026 | 0.0033 | 0.0026 | 0.0025 |
| | Average deviation of coefficient of dynamical friction after 5 minutes | — | 0.0026 | 0.0027 | 0.0032 | 0.0027 | 0.0029 | 0.0037 | 0.0027 | 0.0026 |
| | Marine bio-degradability | % | 40 | 38 | 41 | 39 | 39 | 41 | 36 | 38 |
| | Dispersion stability in linseed oil | % | 4 | 6 | 3 | 5 | 4 | 3 | 13 | 10 |

| | | Unit | Example 29 | Example 30 | Example 31 | Example 32 |
|---|---|---|---|---|---|---|
| Particle properties | Sphericity | — | 96 | 92 | 96 | 90 |
| | Standard deviation of sphericity | — | 1.40 | 1.58 | 1.40 | 1.68 |
| | Volume average particle diameter | μm | 5.5 | 6.4 | 5.5 | 5.9 |
| | Particle size distribution index | — | 1.28 | 1.42 | 1.28 | 1.50 |
| | Amount of impurities contained | % by weight | Undetectable | Undetectable | Undetectable | Undetectable |
| | Stability index over time | — | 0.71 | 0.63 | 0.71 | 0.60 |
| | BET specific surface area $A_{BET}$ | $m^2/g$ | 5 | 0.8 | 5 | 0.8 |
| | Porosity r | % | 30 | 49.6 | 49.6 | 80 |
| | Ratio ($r/A_{BET}$) | — | 6.0 | 62.0 | 9.9 | 100.0 |
| | Melting point of fine particles | ° C. | 263 | 263 | 263 | 263 |
| | Crystallization temperature of fine particles | ° C. | 232 | 232 | 232 | 232 |
| | Weight average molecular weight of fine particles | — | 28,000 | 60,000 | 25,000 | 56,000 |
| Effects | Average deviation of coefficient of dynamical friction immediately after | — | 0.0030 | 0.0040 | 0.0030 | 0.0040 |
| | Average deviation of coefficient of dynamical friction after 5 minutes | — | 0.0032 | 0.0043 | 0.0032 | 0.0050 |
| | Marine biodegradability | % | 40 | 44 | 39 | 45 |
| | Dispersion stability in linseed oil | % | 5 | 2 | 5 | 1 |

TABLE 4

| | | Unit | Example 33 | Example 34 | Example 35 | Example 36 | Example 37 | Example 38 | Example 39 |
|---|---|---|---|---|---|---|---|---|---|
| Particle properties | Sphericity | — | 97 | 90 | 97 | 97 | 97 | 98 | 96 |
| | Standard deviation of sphericity | — | 1.09 | 1.78 | 1.10 | 1.50 | 1.13 | 1.10 | 1.10 |

TABLE 4-continued

| | | | | | | | | | |
|---|---|---|---|---|---|---|---|---|---|
| | Volume average particle diameter | μm | 7.0 | 2.8 | 2.0 | 14.4 | 6.5 | 6.1 | 5.6 |
| | Particle size distribution index | — | 1.30 | 1.58 | 1.31 | 1.45 | 1.38 | 1.31 | 1.43 |
| | Amount of impurities contained | % by weight | 0 | 0 | 0 | 0 | 0 | 0 | 0 |
| | Stability index over time | — | 0.92 | 0.56 | 0.91 | 0.67 | 0.88 | 0.91 | 0.91 |
| | BET specific surface area $A_{BET}$ | $m^2/g$ | 0.7 | 5.3 | 3.9 | 2.5 | 2.8 | 2.5 | 3.4 |
| | Porosity r | % | 11.2 | 84.8 | 49.6 | 49.6 | 49.6 | 49.6 | 49.6 |
| | Ratio (r/$A_{BET}$) | — | 16.0 | 16.0 | 12.7 | 19.8 | 17.7 | 19.8 | 14.6 |
| | Melting point of fine particles | ° C. | 263 | 263 | 263 | 263 | 263 | 263 | 263 |
| | Crystallization temperature of fine particles | ° C. | 232 | 232 | 232 | 232 | 232 | 232 | 232 |
| | Weight average molecular weight of fine particles | — | 65,000 | 22,000 | 27,000 | 27,000 | 27,000 | 27,000 | 27,000 |
| Effects | Average deviation of coefficient of dynamical friction immediately after | — | 0.0026 | 0.0040 | 0.0025 | 0.0029 | 0.0025 | 0.0022 | 0.0026 |
| | Average deviation of coefficient of dynamical friction after 5 minutes | — | 0.0026 | 0.0050 | 0.0025 | 0.0038 | 0.0027 | 0.0023 | 0.0026 |
| | Marine biodegradability | % | 18 | 41 | 41 | 36 | 36 | 36 | 40 |
| | Dispersion stability in linseed oil | % | 6 | 18 | 6 | 3 | 4 | 3 | 6 |

| | | Unit | Example 40 | Example 41 | Example 42 |
|---|---|---|---|---|---|
| Particle properties | Sphericity | — | 90 | 97 | 97 |
| | Standard deviation of sphericity | — | 2.53 | 1.12 | 1.12 |
| | Volume average particle diameter | μm | 5.5 | 5.8 | 5.8 |
| | Particle size distribution index | — | 1.40 | 1.35 | 1.35 |
| | Amount of impurities contained | % by weight | 0 | 0.5 | 0.1 |
| | Stability index over time | — | 0.40 | 0.60 | 0.81 |
| | BET specific surface area $A_{BET}$ | $m^2/g$ | 2.2 | 3.1 | 3.1 |
| | Porosity r | % | 30.3 | 49.6 | 49.6 |
| | Ratio (r/$A_{BET}$) | — | 13.8 | 16.0 | 16.0 |
| | Melting point of fine particles | ° C. | 263 | 263 | 263 |
| | Crystallization temperature of fine particles | ° C. | 232 | 232 | 232 |
| | Weight average molecular weight of fine particles | — | 28,000 | 27,000 | 27,000 |
| Effects | Average deviation of coefficient of dynamical friction immediately after | — | 0.0040 | 0.0025 | 0.0025 |
| | Average deviation of coefficient of dynamical friction after 5 minutes | — | 0.0048 | 0.0050 | 0.0035 |
| | Marine biodegradability | % | 36 | 40 | 40 |
| | Dispersion stability in linseed oil | % | 6 | 4 | 4 |

TABLE 5

| | | Unit | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|
| Particle properties | Sphericity | — | 95 | 78 | 80 | 68 | — | — | — | — | — | — |
| | Standard deviation of sphericity | — | 3.78 | 5.15 | 4.50 | 6.03 | — | — | — | — | — | — |
| | Volume average particle diameter | μm | 10.1 | 8.5 | 5.8 | 15.5 | — | — | — | — | — | — |
| | Particle size distribution index | — | 1.31 | 2.75 | 1.54 | 8.40 | — | — | — | — | — | — |
| | Amount of impurities contained | % by weight | Undetectable | Undetectable | Undetectable | 0.3 | — | — | — | — | — | — |
| | Stability index over time | — | 0.26 | 0.19 | 0.22 | 0.13 | — | — | — | — | — | — |
| | BET specific surface area $A_{BET}$ | $m^2/g$ | 0.8 | 12.7 | 24.0 | 5.8 | — | — | — | — | — | — |
| | Porosity r | % | 0.0 | 32.8 | 62.0 | 21.1 | — | — | — | — | — | — |
| | Ratio ($r/A_{BET}$) | — | 0.0 | 2.6 | 2.6 | 3.6 | — | — | — | — | — | — |
| | Melting point of fine particles | ° C. | 265 | 261 | 262 | 262 | — | — | — | — | — | — |
| | Crystallization temperature of fine particles | ° C. | 230 | 230 | 230 | 232 | — | — | — | — | — | — |
| | Weight average molecular weight of fine particles | — | 45,000 | 42,000 | 20,000 | 28,000 | — | — | — | — | — | — |
| Effects | Average deviation of coefficient of dynamical friction immediately after | — | 0.0042 | 0.0051 | 0.0052 | 0.0059 | — | — | — | — | — | — |
| | Average deviation of coefficient of dynamical friction after 5 minutes | — | 0.0052 | 0.0063 | 0.0058 | 0.0073 | — | — | — | — | — | — |
| | Marine biodegradability | % | 27 | 35 | 42 | 30 | — | — | — | — | — | — |
| | Dispersion stability in linseed oil | % | 40 | 30 | 30 | 35 | — | — | — | — | — | — |

| | | Unit | Comparative Example 11 | Comparative Example 12 | Comparative Example 13 | Comparative Example 14 | Comparative Example 15 |
|---|---|---|---|---|---|---|---|
| Particle properties | Sphericity | — | — | 91 | 91 | 90 | 86 |
| | Standard deviation of sphericity | — | — | 1.44 | 1.42 | 1.70 | 5.15 |

TABLE 5-continued

| | | | | | | | |
|---|---|---|---|---|---|---|---|
| | Volume average particle diameter | µm | — | 6.9 | 5.8 | 5.5 | 6.9 |
| | Particle size distribution index | — | — | 1.51 | 1.55 | 1.48 | 1.89 |
| | Amount of impurities contained | % by weight | — | Unde-tect-able | Unde-tect-able | Unde-tect-able | Unde-tect-able |
| | Stability index over time | — | — | 0.69 | 0.70 | 0.59 | 0.19 |
| | BET specific surface area $A_{BET}$ | $m^2/g$ | — | 0.8 | 3.1 | 5.0 | 9.8 |
| | Porosity r | % | — | 4.0 | 15.5 | 25.0 | 55.4 |
| | Ratio ($r/A_{BET}$) | — | — | 5.0 | 5.0 | 5.0 | 5.7 |
| | Melting point of fine particles | ° C. | — | 263 | 263 | 263 | 263 |
| | Crystallization temperature of fine particles | ° C. | — | 232 | 232 | 232 | 232 |
| | Weight average molecular weight of fine particles | — | — | 65,000 | 28,000 | 28,000 | 20,000 |
| Effects | Average deviation of coefficient of dynamical friction immediately after | — | — | 0.0041 | 0.0041 | 0.0045 | 0.0051 |
| | Average deviation of coefficient of dynamical friction after 5 minutes | — | — | 0.0043 | 0.0042 | 0.0047 | 0.0063 |
| | Marine biodegrad-ability | % | — | 30 | 30 | 30 | 35 |
| | Dispersion stability in linseed oil | % | — | 38 | 38 | 38 | 35 |

INDUSTRIAL APPLICABILITY

Our polyamide fine particles and the method of producing the same are suitable for achieving the polyamide fine particles having a small average deviation of the coefficient of dynamical friction when the particles are rubbed together, a small average deviation of the coefficient of dynamical friction after time elapsed, and the marine biodegradability.

The invention claimed is:

1. Polyamide fine particles comprising a polymer or a copolymer including a repeating structure unit represented by Formula (1) as a main component, wherein a ratio ($r/A_{BET}$) of a porosity r occupying a particle surface and a BET specific surface area $A_{BET}$ that is a specific surface area of the particle surface measured by a BET method is 6.0 or more and 100.0 or less:

Formula (1)

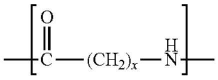

wherein x is an integer of 2 or more and 3 or less, and wherein the polyamide fine particles have a sphericity of 90 or more.

2. The polyamide fine particles according to claim 1, wherein the BET specific surface area $A_{BET}$ is 0.8 $m^2/g$ or more and 5.0 $m^2/g$ or less.

3. The polyamide fine particles according to claim 1, wherein an amount of impurities contained is 0.50% by weight or less.

4. The polyamide fine particles according to claim 1, having a volume average particle diameter of 0.1 µm or more and 100 µm or less.

5. The polyamide fine particles according to claim 1, wherein a standard deviation of sphericity is 2.00 or less.

6. The polyamide fine particles according to claim 1, wherein x in Formula (1) is 3.

7. The polyamide fine particles according to claim 1, wherein a stability index over time that is an index representing stability toward deterioration in feel to the polyamide fine particles that are continuously rubbed is calculated in accordance with Formula (2) and is 0.60 or more:

Temporal stability index=1/(Standard deviation of sphericity×(1+Amount of impurities contained))   (2)

wherein, in the above formula, the standard deviation of sphericity is a standard deviation of sphericity of the polyamide fine particles, and the amount of impurities contained is an amount of impurities contained in the polyamide fine particles.

8. Polyamide fine particles comprising a polymer or a copolymer including a repeating structure unit represented by Formula (1) as a main component, wherein a sphericity is 96 or more, an amount of impurities contained is 0.50% by weight or less, a standard deviation of sphericity is 2.00 or less, and a stability index over time that is an index representing stability toward deterioration in feel to the polyamide fine particles that are continuously rubbed is calculated in accordance with the following formula and is 0.60 or more:

Formula (1)

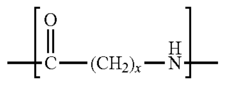

wherein x is an integer of 2 or more and 3 or less, and temporal stability index=1/(Standard deviation of sphericity×(1+Amount of impurities contained)) wherein the standard deviation of sphericity is a standard deviation of sphericity of the polyamide fine particles, and the amount of impurities contained is an amount of impurities contained in the polyamide fine particles.

9. The polyamide fine particles according to claim 8, wherein a BET specific surface area $A_{BET}$ that is a specific surface area of a particle surface measured by a BET method is 5.0 $m^2/g$ or less.

10. The polyamide fine particles according to claim 8, wherein a volume average particle diameter is 0.1 μm or more and 100.0 μm or less.

11. The polyamide fine particles according to claim 8, wherein x in Formula (1) is 3.

12. A method of producing polyamide fine particles using a resin (A) and a resin (B) as raw materials, the resin (A) being a polymer or a copolymer including a repeating structure unit represented by Formula (1) as a main component, the resin (B) being an emulsion formation resin capable of forming an emulsion with the resin (A) in a molten state, the method comprising:

an emulsion formation step of melt mixing the resin (A) and the resin (B) at a melting temperature equal to or higher than a melting point of the resin (A) and a melting point of the resin (B) to form an emulsion in which the resin (A) in a particulate form is dispersed in the resin (B);

an immobilization step of cooling a molten mixture in which the emulsion of the resin (A) and the resin (B) is formed to a temperature equal to or lower than a crystallization temperature of the resin (A) to immobilize the emulsion; and a collecting step of removing the resin (B) by washing with a washing solution that is a non-solvent of the resin (A) to collect polyamide fine particles formed of the resin (A), wherein a melt viscosity ratio of the resin (A) and the resin (B) at 270° C. is 4.3 or more and 125.0 or less:

Formula (1)

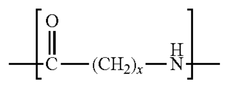

wherein x is an integer of 2 or more and 3 or less.

13. The method according to claim 12, wherein the immobilization step comprises:

a retention step of retaining a temperature of a molten mixture in a temperature range of more than a crystallization temperature of the resin (A) and less than the melting point of the resin (A); and a cooling step of cooling a temperature of the molten mixture that has been retained in the temperature range, to a crystallization temperature of the resin (A) or lower, and wherein, at the retention step, the temperature of the molten mixture is retained in the temperature range for 30 minutes or more and 10 hours or less.

14. The method according to claim 12, wherein the immobilization step comprises:

a retention step of retaining a temperature of the molten mixture in a temperature range of higher than a crystallization temperature of the resin (A) and lower than a melting point of the resin (A) for 1 second or more and 10 minutes or less; and a cooling step of cooling the temperature of the molten mixture that has been retained in the temperature range, to the crystallization temperature of the resin (A) or lower.

15. The method according to claim 12, wherein the emulsion formation step comprises a temperature rising step of raising a temperature of the resin (A) and the resin (B) from room temperature to the melting temperature.

16. The method according to claim 12, wherein a melt viscosity of the resin (B) at 270° C. is 0.40 Pa·s or more and 5.00 Pa·s or less.

17. The method according to claim 12, wherein the resin (B) is polyethylene glycol.

18. The method according to claim 12, wherein, at the emulsion formation step, the resin (A) and the resin (B) are melt-mixed at the melting temperature equal to or more than a melting point of the resin (A)+5° C. and equal to or less than 280° C.

* * * * *